US006005355A

United States Patent [19]

Siao

[11] Patent Number: 6,005,355

[45] **Date of Patent: *Dec. 21, 1999**

[54] ELECTRONIC BALLAST SYSTEM FOR FLUORESCENT LAMPS

[75] Inventor: Roger Siao, Los Banos, Calif.

[73] Assignees: Susan Siao, Los Banos, Calif.; Anne Chon My Yeung, Burlingame, Calif.

[ * ] Notice: This patent is subject to a terminal disclaimer.

[21] Appl. No.: 08/899,184

[22] Filed: Jul. 23, 1997

Related U.S. Application Data

[63] Continuation-in-part of application No. 08/773,693, Dec. 27, 1996.

[51] Int. Cl.[6] .......................... H02M 3/22; H05B 41/36; H05B 41/00

[52] U.S. Cl. .................................. 315/277; 315/DIG. 5; 315/219; 315/205; 315/312; 315/248; 336/84 R

[58] Field of Search .................................. 315/276, 277, 315/248, DIG. 5, 219, 205, 312; 336/84 R; 307/91

[56] References Cited

U.S. PATENT DOCUMENTS

| | | | |
|---|---|---|---|
| 3,963,975 | 6/1976 | Gauper, Jr. et al. | 307/91 X |
| 4,873,471 | 10/1989 | Dean et al. | 315/308 |

*Primary Examiner*—Arnold Kinkead
*Attorney, Agent, or Firm*—Flehr Hohbach Test Albritton & Herbert LLP

[57] ABSTRACT

Electronic ballast system for fluorescent lights. A power oscillator connected to the primary winding of a power transformer for operation at a predetermined frequency in the range of 10 KHz to 5 MHz, and a ballasting network is connected to the secondary winding of the transformer and to one or more fluorescent lamps. The ballasting network is resonant at a frequency within about ±10 percent of the predetermined frequency, and in some embodiments, the resonant frequency of the ballasting network remains the same regardless of the number of lamps connected to it.

40 Claims, 26 Drawing Sheets

VAC
FUSE
RV1
THERMOSTAT
T3
VDD
C8
C9
BRIDGE-1
C7
C10
C11
C12
C13
CG
Va
Vb
Vz
R1
R2
R3
R4
R5
R6
R7
D1
D2
D3
D4
D5
Q1
Q2
C1
C2
C3
C4
C5
C6
NC
L22
Ls
T2
T1
TCH
LCH1
LCH2
L11A
L11B
L33A
L33B
117a
117b

VAC
FUSE
RV1
THERMOSTAT
T3
VDD
C8
C9
BRIDGE-1
C7
R1
R5
Vb
Va
Vz
CG
C10
C11
C12
C13
R6
R2
R7
D3
C3
C4
L33A
L33B
Q1
Q2
D1
D2
D4
D5
R3
R4
R8
R9
C1
C2
LCH1
LCH2
L11A
L11B
T1
TCH
L22
C5
C6
NC
Ls
T2
109
17
19
21
22
26
27
28
29
31
54
102
103
107
111
112
113
114
116
117a
117b
119
121
122
123
124
126
127
128
129
131
133
134
136
138
139
141
142
143
144
146
148
149
151
152

ELECTRONIC BALLAST SYSTEM FOR FLUORESCENT LAMPS

CROSS-REFERENCE TO RELATED APPLICATION

This is a continuation-in-part of Ser. No. 08/773,693, filed Dec. 27, 1996.

BACKGROUND OF THE INVENTION

1. Field of the Invention

This invention pertains generally to fluorescent lighting and, more particularly, to an electronic ballast system for fluorescent lamps.

2. Related Art

Heretofore, electronic ballasts have been provided for use with fluorescent lamps. Examples of such ballasts are found in U.S. Pat. Nos. 4,245,178 and 4,631,449.

Electronic ballasts typically operate at frequencies on the order of 10 KHz to 100 KHz, and are designed to provide high circuit efficiency, high reliability, and low cost. While the physical size and weight of ballasts are dependent upon operating frequency, with higher frequencies permitting ballasts to be smaller in size and lighter in weight, reductions in size and weight have not been easy to achieve.

In order to reduce losses, multiple wires or Litz wires have been used for transformer windings, but they add substantially to the cost of manufacture. The cost can be reduced somewhat by using single conductor, continuous windings on power transformers. However, that substantially reduces the coefficient of coupling and can result in high leakage flux which puts a heavy stress both on the transformer itself and on any switching devices or diodes used in the high energy path. In addition, leakage flux can also produce high voltage spikes and can cause electromagnetic interference in the nearby environment.

The higher flux drives and higher circulating currents required for reactive loading of a power transformer in prior systems can also increase core loss as well as loss in the windings themselves. To avoid such losses, it has heretofore been necessary to use larger cores and multiple conductors in the transformer windings.

OBJECTS AND SUMMARY OF THE INVENTION

It is in general an object of the invention to provide a new and improved ballast system for fluorescent lights.

Another object of the invention is to provide a ballast system of the above character which overcomes the limitations and disadvantages of the prior art.

These and other objects are achieved in accordance with the invention by providing an electronic ballast system which has a transformer with primary and secondary windings, a power oscillator connected to the primary winding for operation at a predetermined frequency in the range of 10 KHz to 5 MHz, and a ballasting network connected to the secondary winding and adapted for connection to the fluorescent lamp, with the ballasting network being resonant at a frequency within about ±10 percent of the predetermined frequency when connected to the lamp. In some embodiments, the resonant frequency of the ballasting network remains the same regardless of the number of lamps connected to it. Due to the resonance in the ballasting network, only resistive loading transformation occurs in the power transformer.

DETAILED DESCRIPTION

Figure 1:
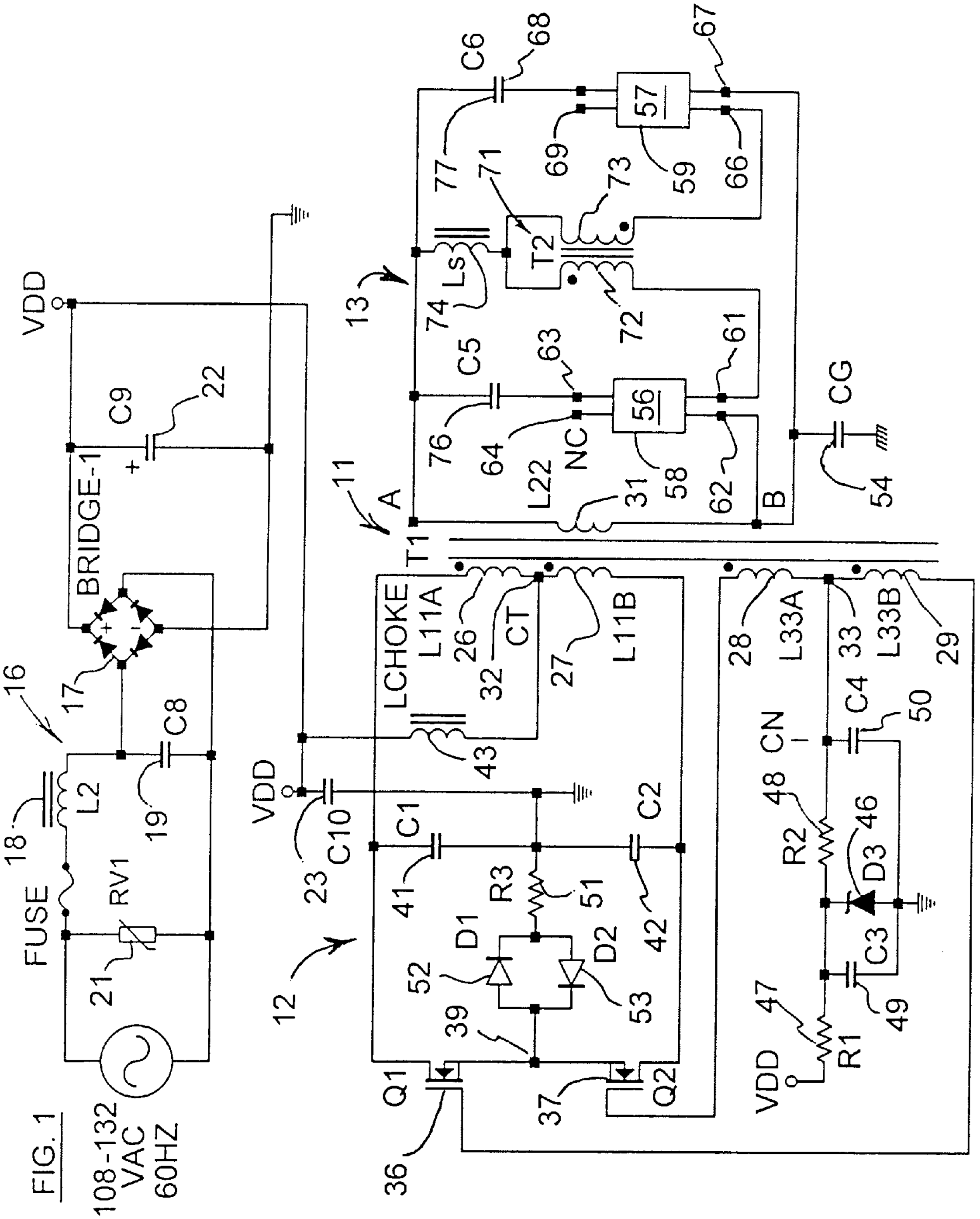
FIG. 1 is a circuit diagram of one embodiment of an electronic ballast system according to the invention.

As illustrated in FIG. 1, the ballast system includes a transformer 11, a power oscillator 12 connected to the primary of the transformer, and a ballasting network 13 connected to the secondary of the transformer. As discussed hereinafter in greater detail, the oscillator is doubly tuned, with the frequency determining components of the oscillator and the ballasting network being tuned to substantially the same frequency.

Operating power is provided by a power supply 16 which is connected to a standard (e.g., 120 volt, 60 cycle) AC source. The power supply includes full-wave bridge rectifier 17 which is connected to the source through a low-pass LC filter consisting of an inductor 18 and a capacitor 19. A varistor 21 is connected across the source to absorb transient disturbances from the power lines, and a filter capacitor 22 and an RF bypass capacitor 23 are connected to the output of the rectifier bridge. The supply provides a DC output voltage $V_{DD}$.

Transformer 11 has primary windings 26, 27, feedback or drive windings 28, 29, and a secondary winding 31. The two primary windings are connected together in series at a common node or center tap 32, and the two drive windings are connected together at a common node or center tap 33.

Power oscillator 12 is a doubly tuned, current switched, transformer coupled, Class-D power oscillator that includes a pair of switching transistors 36, 37, which in the embodiment illustrated are high power MOSFETs. It will be understood, however, that the invention is not limited to a particular type of switching device, and that other switching devices such as bipolar junction transistors (BJTs) or junction field effect transistors (JFETs) can be used.

The drains of the switching transistors are connected to the outer ends of primary windings 26, 27, and the gates are connected to the outer ends of drive windings 28, 29. The sources of the transistors are connected together at a common source node 39.

Capacitors 41, 42 are connected between the outer ends of primary windings 26, 27, and the junction of the two capacitors is connected to ground. These capacitors resonate with the total inductance of the primary windings to determine the operating frequency of the oscillator, and they also serve to protect the switching transistors by providing a low AC impedance between the drains of the transistors and ground when subjected to high frequency transient signals or voltage spikes. The presence of the capacitors also makes the coefficient of coupling of the transformer less critical, and avoids the need for an extremely high coupling factor (e.g., a factor greater than 0.98). The values of the inductances and the capacitances are chosen to provide resonance at a frequency in the range 10 KHz to 5 MHz.

The voltages at the outer ends of drive windings 28, 29 are in phase with the voltages at the outer ends of primary windings 26, 27, which provides regenerative or positive feedback to establish and maintain self-oscillation in the circuit.

The supply voltage $V_{DD}$ is applied to the center tap or common node of the primary windings through an RF choke 43 which prevents AC fluctuations in the switching current of the oscillator.

The switching transistors are self-biased, and source degeneration is employed to ensure low power loss and high DC to AC conversion efficiency. A biasing voltage of substantially constant magnitude is provided by a voltage regulator consisting of a Zener diode 46 and a dropping resistor 47 connected between the output of the power supply and ground. The voltage developed across the Zener diode is applied to the center tap or common node of drive windings 28, 29 by a low pass filter consisting of a resistor 48 and a capacitor 49. In addition to coupling the reference voltage to the transistor inputs, the filter isolates the Zener diode from AC voltages in the drive windings. An AC bypass capacitor 50 is connected between the common node of the drive windings and ground.

A current sensing resistor 51 and a pair of parallel connected, back-to-back diodes 52, 53 are connected in series between the common source node 39 and ground to form a degenerative or negative feedback network which controls the gain and DC bias currents, and enhances the stability of the circuit. During operation, the gain of the circuit is decreased by the source voltage feedback, and any abnormal swing in the voltage at the drains of the transistors is automatically reduced, as is any abnormal current flowing through the transistors.

A grounding capacitor 54 is connected between the lower end of secondary winding 31 and the metal enclosure of the system to provide an AC path for EMI energy which radiates from electronic components and couples to the enclosure to return to circuit ground. The enclosure is connected to an earth ground, and the grounding capacitor also provides an AC current return path for the lamps during the capacitive discharge mode.

In the embodiment of FIG. 1, ballasting network 13 is specifically intended for use with instant-start fluorescent lamps 56, 57 which are mounted in sockets 58, 59. There are two internally connected connector pins at each end of the lamps, and the sockets have terminals 61–64 and 66–69 for contact with the pins.

The ballasting network comprises a differential transformer 71 which has tightly coupled windings 72, 73 with a coefficient of coupling near unity. Each of those windings is connected electrically in series with an inductor 74, with opposite phase ends of the windings being connected to one end of the inductor. The other end of the inductor is connected to the upper end of secondary winding 31 of transformer 11, and the remaining ends of windings 72, 73 are connected to terminals 61, 66 at the lower ends of the lamp sockets. The other terminals 62, 67 at the lower ends of the sockets are connected to the lower end of winding 31. Capacitors 76, 77 are connected between the upper end of secondary winding 31 and terminals 63, 68 at the upper ends of the lamp sockets. No connections are made to socket terminals 64, 69 in this embodiment.

Ballasting network 13 is thus a tank circuit in which capacitors 76, 77 are connected electrically in parallel with inductor 74 when the lamps are installed in their sockets. The inductances of the two windings 72, 73 of the differential transformer are equal to each other and to the inductance of series inductor 74. Capacitors 76, 77 are also equal in value.

With both lamps installed, the inductances of the two windings of the differential transformer cancel, and the resonant frequency of the tank circuit is determined by L in parallel with 2C, where L is the inductance of the series inductor, and 2C is the capacitance of capacitors 76, 77 in parallel.

With only one lamp installed, only one winding of the differential transformer and one of the two capacitors are connected in the circuit, and the resonant frequency is determined by 2L in parallel with C, where 2L is the inductance of the differential transformer winding in series with inductor 74, and C is the capacitance of the one capacitor in the circuit.

Thus, the resonant frequency of network 13 is the same with either or both of the lamps installed. That frequency is chosen to be substantially equal to the resonant frequency of the circuit on the primary side of transformer 11. The two frequencies do not have to be exactly equal, and the system will work quite well if they are within about ±10 percent of each other. With resonant circuits on both sides of the transformer, the power oscillator can be said to be doubly tuned.

If both lamps are removed from their sockets, all of the impedance elements in the ballasting network are disconnected from the secondary winding, the double tuned power oscillator becomes a single tuned oscillator, and the oscillator frequency is determined solely by the resonant tank circuit on the primary side of the transformer.

The natural frequency of the power oscillator remains constant regardless of the number of lamps which are connected. A plurality of resonant ballasting networks can be connected to the transformer secondary to drive any desired number of lamps, and those networks will all resonate at the frequency for which they are designed regardless of the number of lamps connected. Furthermore, the power dissipated by each lamp which is connected remains the same whether one lamp or more is/are connected.

Figure 2:
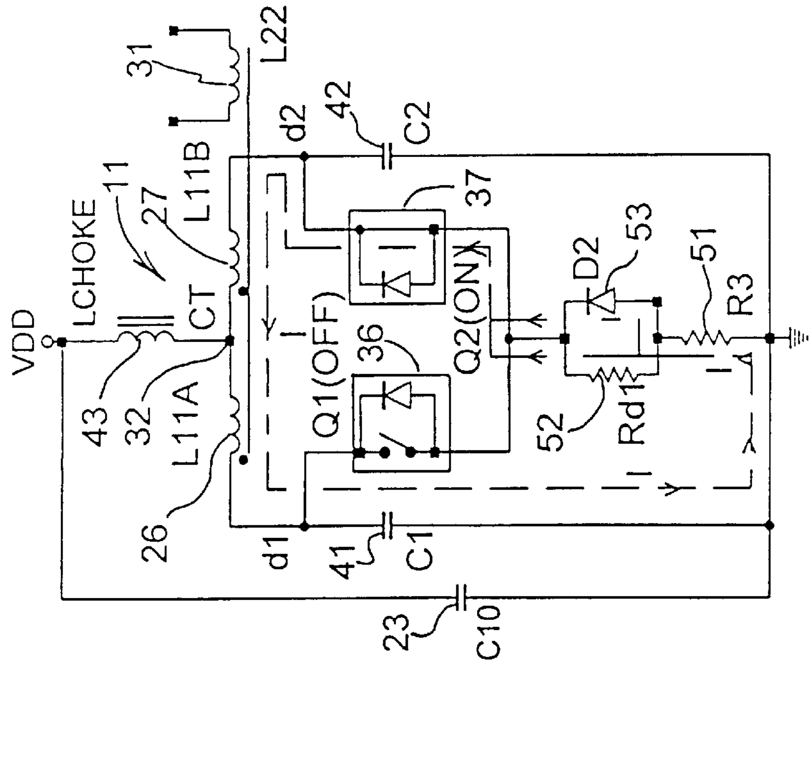
FIG. 2 is an AC equivalent circuit of the primary section of the system of FIG. 1.

FIG. 2 shows an AC equivalent circuit of the primary section of the embodiment of FIG. 1, with transistor 37 (Q2) conducting and transistor 36 (Q1) off. $R_{d1}$ represents the AC impedance of the diode 52 (D1) which is biased in the forward direction when transistor Q2 is conducting. The primary current flows around a loop comprising primary windings 26, 27, capacitor 41 (C1), resistor 51 (R3), the AC impedance $R_{d1}$ of diode 52, diode 53 (D2), and transistor 37 (Q2). When transistor Q1 is conducting, the current flows around a loop comprising the primary windings, capacitor 42 (C2), resistor 51 (R3), the AC impedance $R_{d1}$ of diode 52, diode 53 (D2), and transistor 36 (Q1).

The AC impedance $R_{d1}$ of diode 52 varies inversely with the current through it, and is approximately equal to 26 $mV/I_{DD}$, where $I_{DD}$ is the loaded or unloaded DC current of the amplifier.

The gain of the amplifier is proportional to the load impedance $Z_L$ and inversely proportional to the AC impedance of diode 52 (D1). For values of $g_m$ such that $1/g_m << R_{d1}+R_3$, $$G \cong \frac{Z_L}{R_{d1}+R_3}$$

where $g_m$ is the transconductance of the transistor, $R_3$ is the resistance of the resistor 51 in series with the diode. As the load increases (i.e., $Z_L$ decreases), the current through the diode increases, the impedance of the diode decreases, and the gain of the amplifier increases. As the load decreases, the impedance of the diode increases, and the gain of the amplifier decreases. The diode thus serves as an automatic gain control, increasing the gain as the load increases and decreasing the gain as the load decreases.

The impedances of resistor 51 and diodes 52,53 are much smaller than those of primary windings 26, 27 and capacitors 41, 42, and resistor 51 and diodes 52, 53 thus have little effect on the natural frequency of the primary section. Hence, assuming that the parasitic capacitances of the windings and the output capacitances of the switching devices are also small enough to be ignored, the natural frequency of the primary circuit is determined by the relationship $$\frac{1}{2\pi\sqrt{L_{11}\cdot C}}$$

where $L_{11}$ is the total inductance of primary windings 26, 27 and C is the capacitance of capacitor 41 (C1) or capacitor 42 (C2), depending upon which transistor is conducting, with C1 and C2 typically being equal in value.

Figure 3:
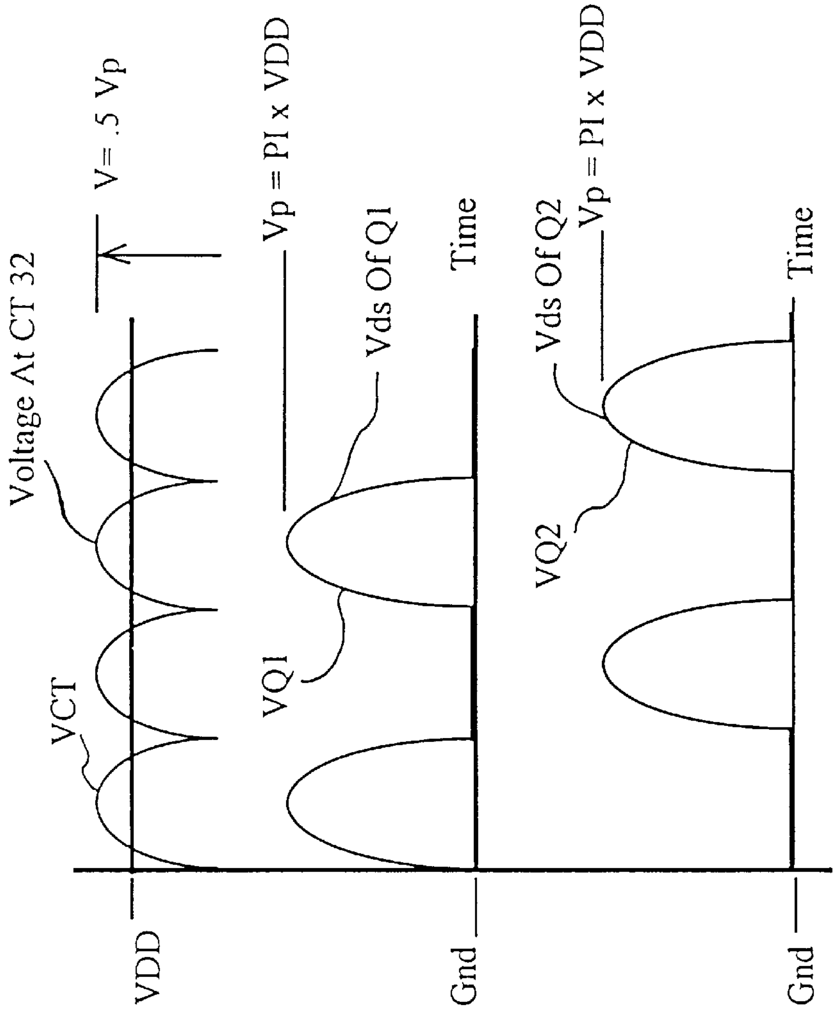
FIG. 3 is a set of waveform diagrams of the voltages at certain points in the system of FIG. 1.

The relationship between the voltage $V_{CT}$ at the center tap 32 of the primary winding of the power transformer and the drain-source voltages $V_{Q1}$ and $V_{Q2}$ of transistors 36, 37 is illustrated in FIG. 3. The center tap voltage is full-wave rectified and rises above and below the supply voltage $V_{DD}$ with its peak-to-peak voltage equal to one-half of the peak voltages across the transistors. The drain-source voltages are half-wave rectified and are 180° out of phase with each other. The peak magnitude of the drain-source voltages is $\pi \cdot V_{DD}$.

Figure 4:
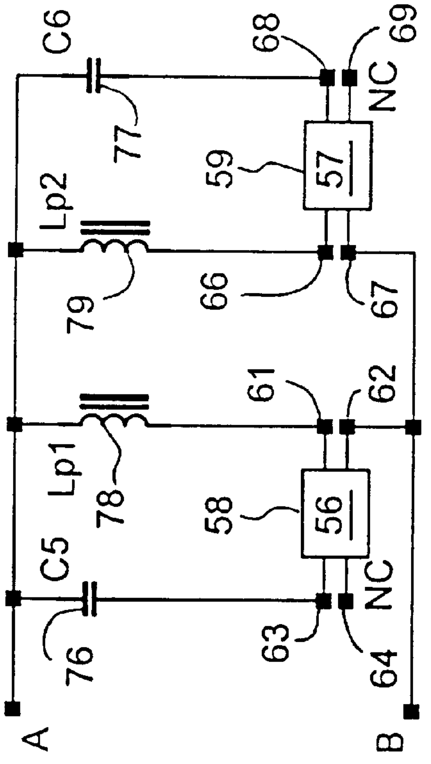

FIG. 4 illustrates another embodiment of a ballasting network for use with instant-start lamps wherein the resonant frequency and the power dissipated remain the same with one lamp or two. This network is similar to the network of FIG. 1 except the differential transformer 71 and series inductor 74 are replaced by two inductors 78, 79 of equal inductance.

With both lamps installed, the network consists of two identical parallel tanks, each of which is tuned to substantially the same frequency as the tank circuit on the primary side of the transformer. With one lamp removed, the network consists of a single tank circuit tuned to that frequency. With both lamps removed, the oscillator frequency is determined solely by the primary tank circuit. In all three cases, the frequency remains the same.

Figure 5:
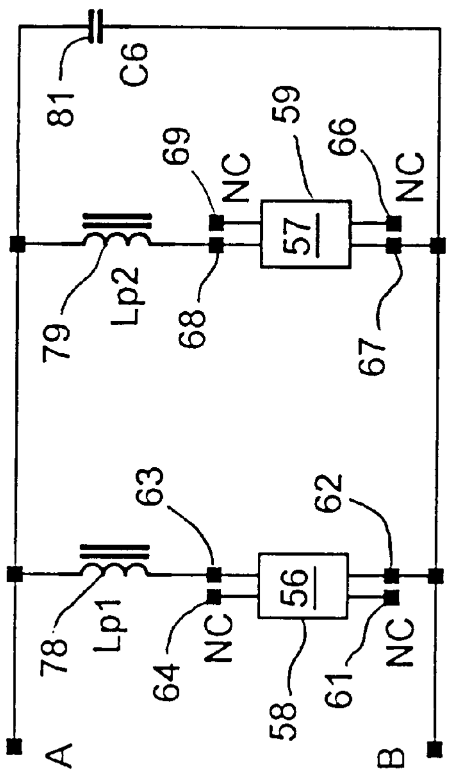
FIGS. 4–7 are circuit diagrams of other embodiments of ballasting networks for use in the system of FIG. 1.

In the embodiment of FIG. 5, inductors 78, 79 of equal inductance are once again connected in series with instant-start lamps. Here, however, a single resonating capacitor 81 is connected in parallel with the inductors and lamps. The resonant frequency of the combined parallel network is made equal to the resonant frequency of the primary circuit so that when both lamps are connected, the tank circuits on both sides of the transformer will be tuned to the same frequency. When one of the lamps is removed, however, the two resonant frequencies will be mismatched by a factor of 0.707.

Figure 6:
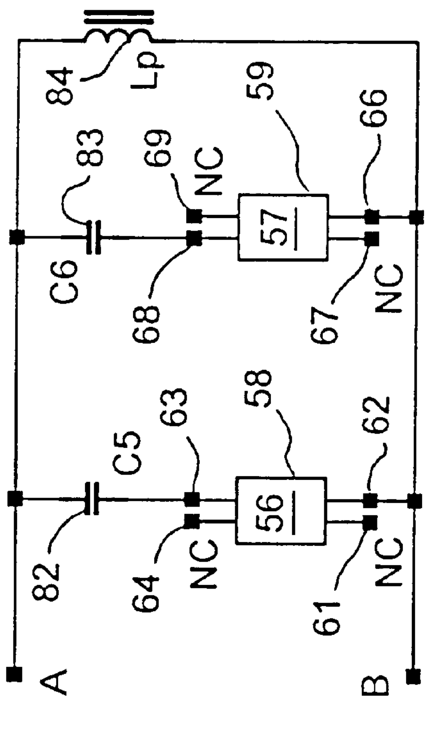

The ballasting network of FIG. 6 is similar to the network of FIG. 5 except it has capacitors 82, 83 of equal value in series with the instant-start lamps and an inductor 84 in parallel with the capacitors and lamps. As in the embodiment of FIG. 5, the resonant frequency of the combined parallel network is made equal to the resonant frequency of the primary circuit so that when both lamps are connected, the tank circuits on both sides of the transformer will be tuned to the same frequency. When one of the lamps is removed, the two resonant frequencies will once again be mismatched by a factor of 0.707.

Figure 7:
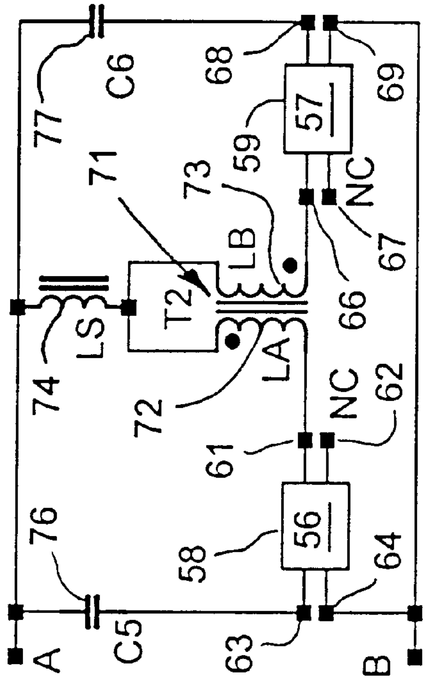

The ballasting network of FIG. 7 is similar to that shown in FIG. 1 except the bottom end of the secondary winding of transformer 11 is connected to terminals 64, 69 at the upper ends of the tubes, and terminals 62, 67 are left unconnected. This network operates in a manner similar to the network of FIG. 1, and the frequency characteristics of the two are the same.

Figure 8:
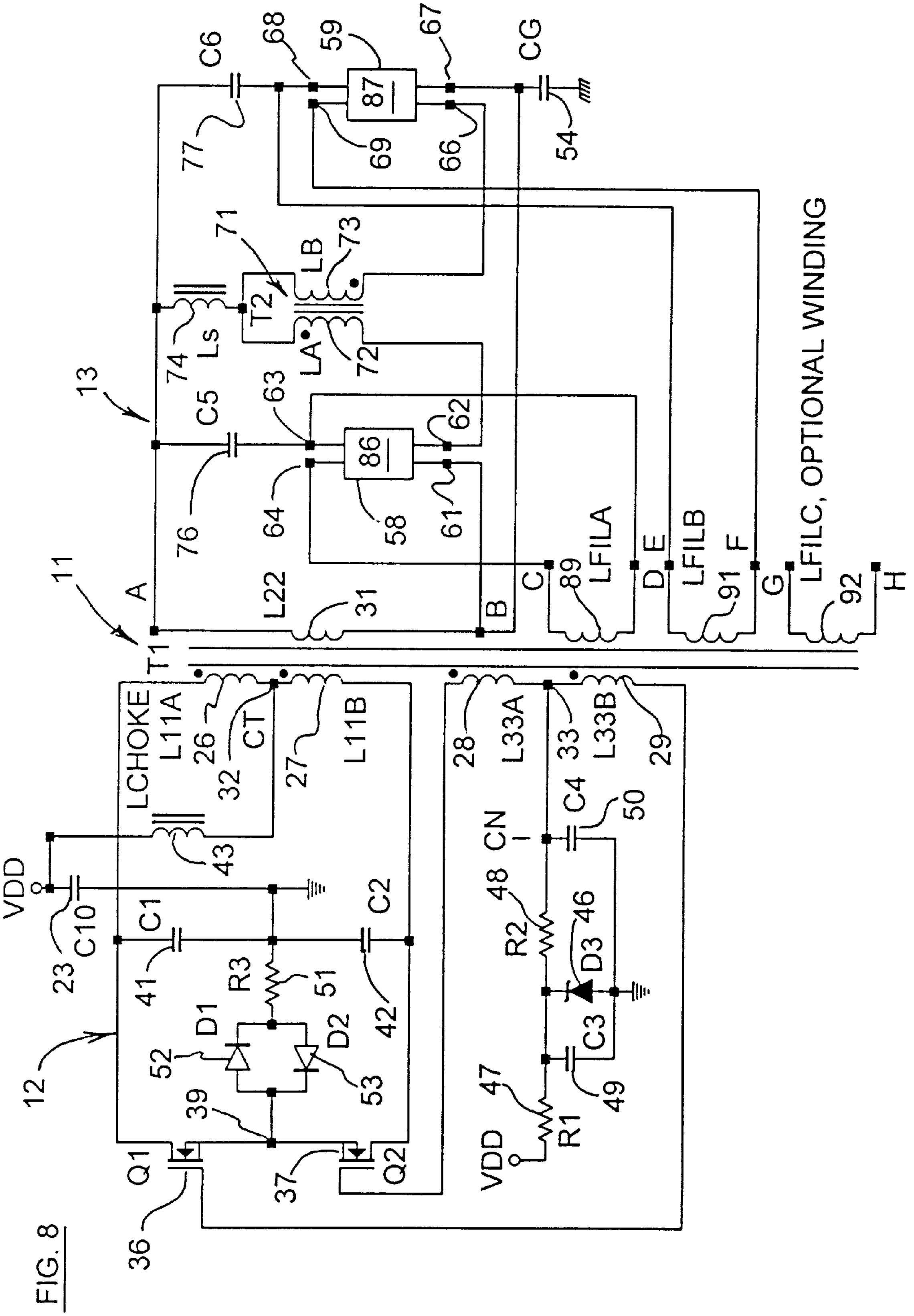
FIGS. 8–9 are circuit diagrams of additional embodiments of an electronic ballast system according to the invention.

FIG. 8 illustrates a system for use with rapid-start fluorescent lamps 86, 87. This embodiment is similar to that of FIG. 1, and like reference numerals designate corresponding elements in the two embodiments. In the embodiment of FIG. 8, however, transformer 11 has two filament windings 89, 91 which are connected to the cathode electrodes in the lamps which are connected to the series capacitors 76, 77 in the ballasting network. Thus, in this embodiment, two of the cathode electrodes are energized by the filament windings, and the other two are energized by the circulating current flowing through the series inductor 74. The addition of the filament windings does not affect the resonant frequency of the ballasting network, and that frequency remains the same whether one or two lamps are connected.

Ballasting networks similar to those shown in FIGS. 4–7 can also be used with rapid-start lamps in the system of FIG. 6, with filament windings 89, 91 powering the cathode electrodes at one end of the lamps. With the networks of FIGS. 5 and 6, a third filament winding 92 (shown in FIG. 8) is utilized for energizing the cathode electrodes at the other end of the lamps.

Figure 9:
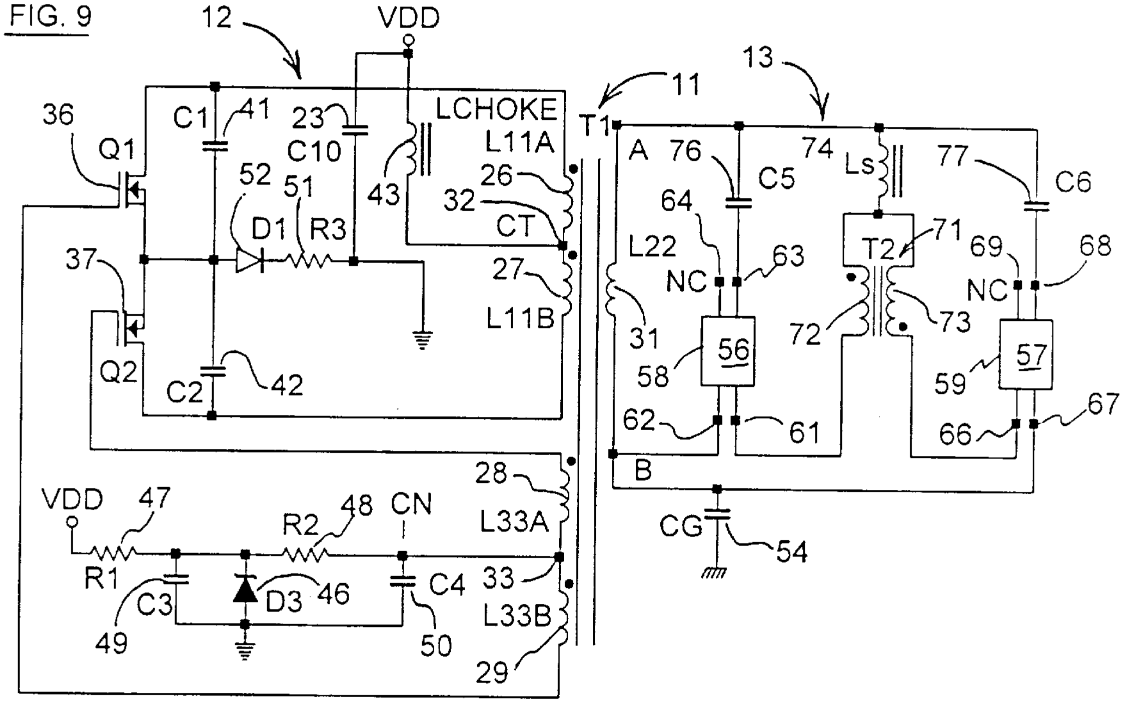

FIG. 9 illustrates another embodiment which is similar to the embodiment of FIG. 1 except the junction of capacitors 41, 42 is connected to the common source node 39 of the switching transistors 36, 37, rather than being connected to ground. In this embodiment, only a single diode 52 is required rather than the back-to-back pair of FIG. 1. The frequency characteristics of this embodiment are identical to those of FIG. 1, and this embodiment can be utilized with any of the ballasting networks shown in FIGS. 4–7, either for instant-start lamps or for rapid-start lamps.

Figure 10:
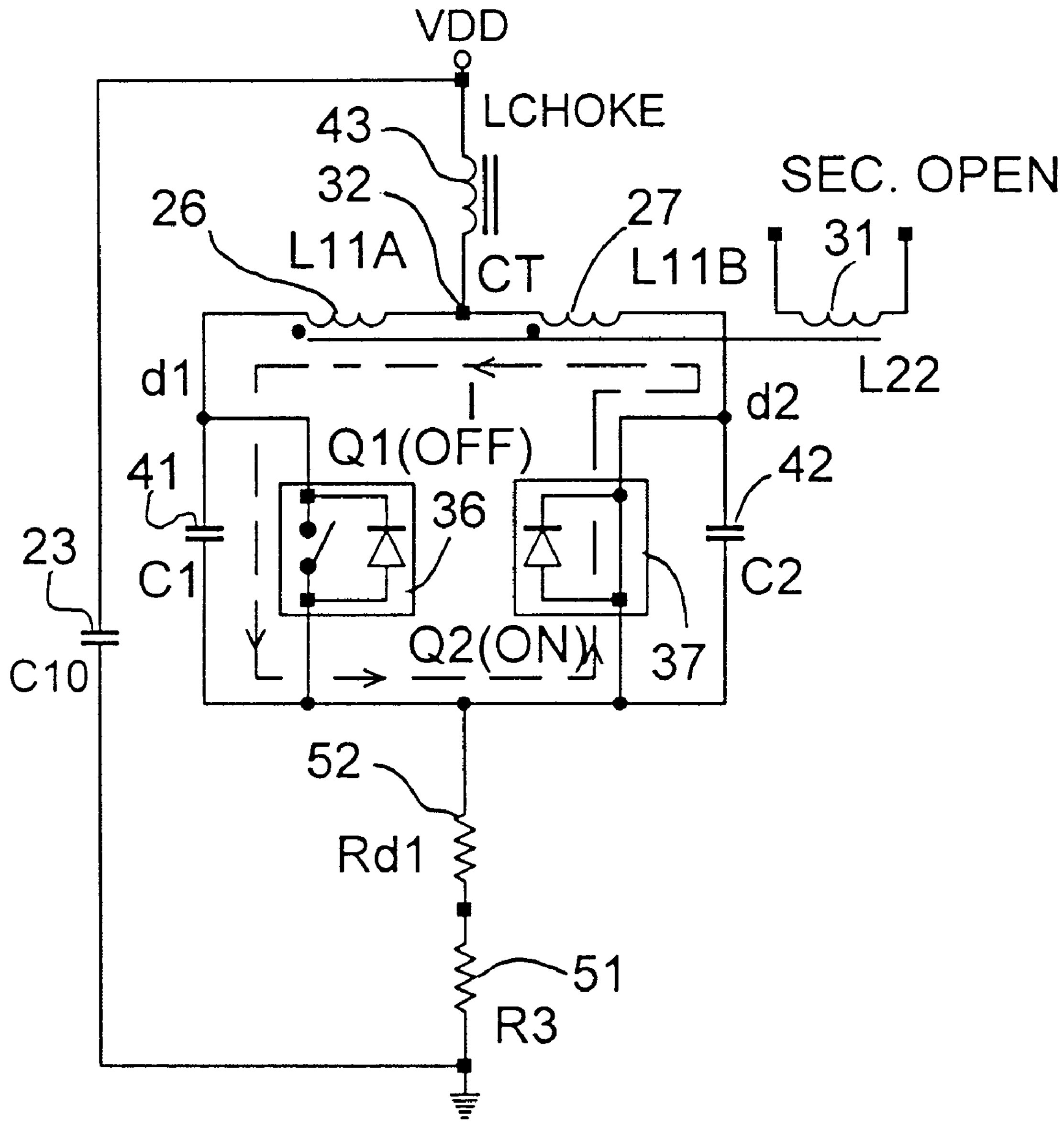
FIG. 10 is an AC equivalent circuit of the primary section of the embodiment of FIG. 9.

FIG. 10 shows an AC equivalent circuit of the primary section of the embodiment of FIG. 9, with transistor 37 (Q2) conducting and transistor 36 (Q1) off. In this embodiment, the loop current does not flow through the diode, and with transistor 37 (Q2) conducting, the loop through which the primary current flows comprises primary windings 26, 27, capacitor 41 (C1) and transistor 37 (Q2). With transistor 36 (Q1) conducting, the loop comprises the primary windings, capacitor 42 (C2) and transistor 36 (Q1).

Ignoring a small voltage drop across resistor 51 (R3) and diode 52, the voltage waveforms in this embodiment are similar to those shown in FIG. 3.

Figure 11:
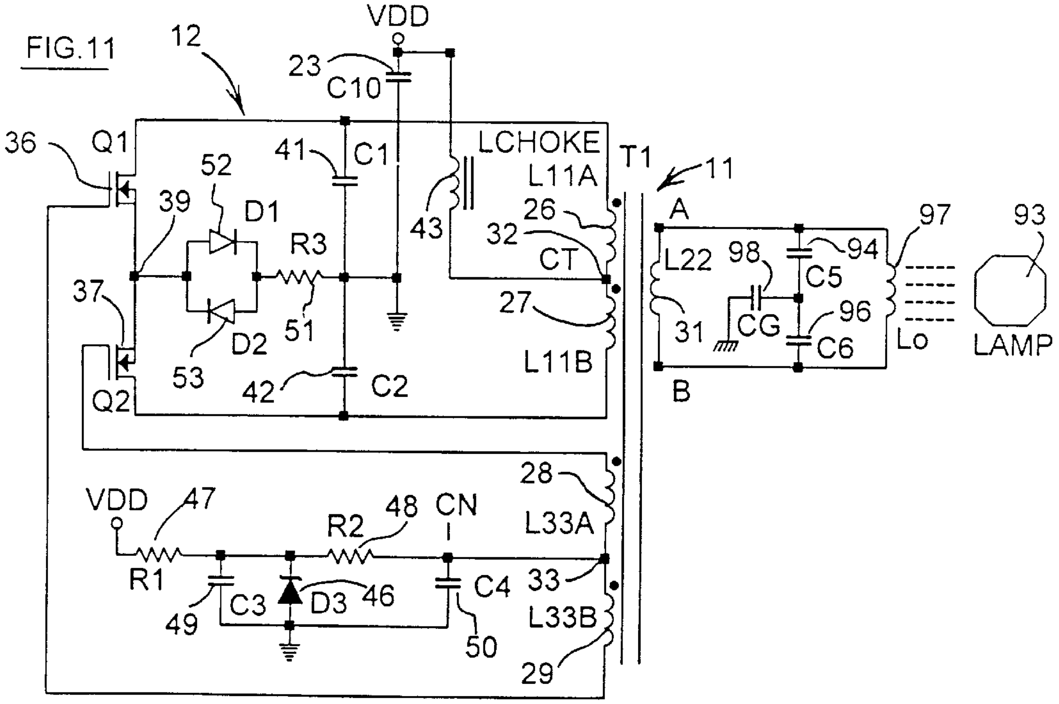
FIGS. 11–13 are circuit diagrams of additional embodiments of an electronic ballast system according to the invention.

FIG. 11 illustrates a system for use with an induction discharge lamp 93. This system is similar to the embodiment of FIG. 1, and like reference numerals designate corresponding elements in the two. In the embodiment of FIG. 11, however, the ballasting network consists of two capacitors 94, 96 of equal value connected in series across the secondary of transformer 11, and an inductor 97 which is connected in parallel with the two capacitors. An AC grounding capacitor 98 is connected between the junction of the capacitors 94, 96 and an earth ground. The tank circuit formed by capacitors 94, 96 and inductor 97 is tuned to substantially the same frequency as the tank circuit on the primary side of the transformer, and the inductor radiates an AC magnetic field which couples to the lamp.

Figure 12:
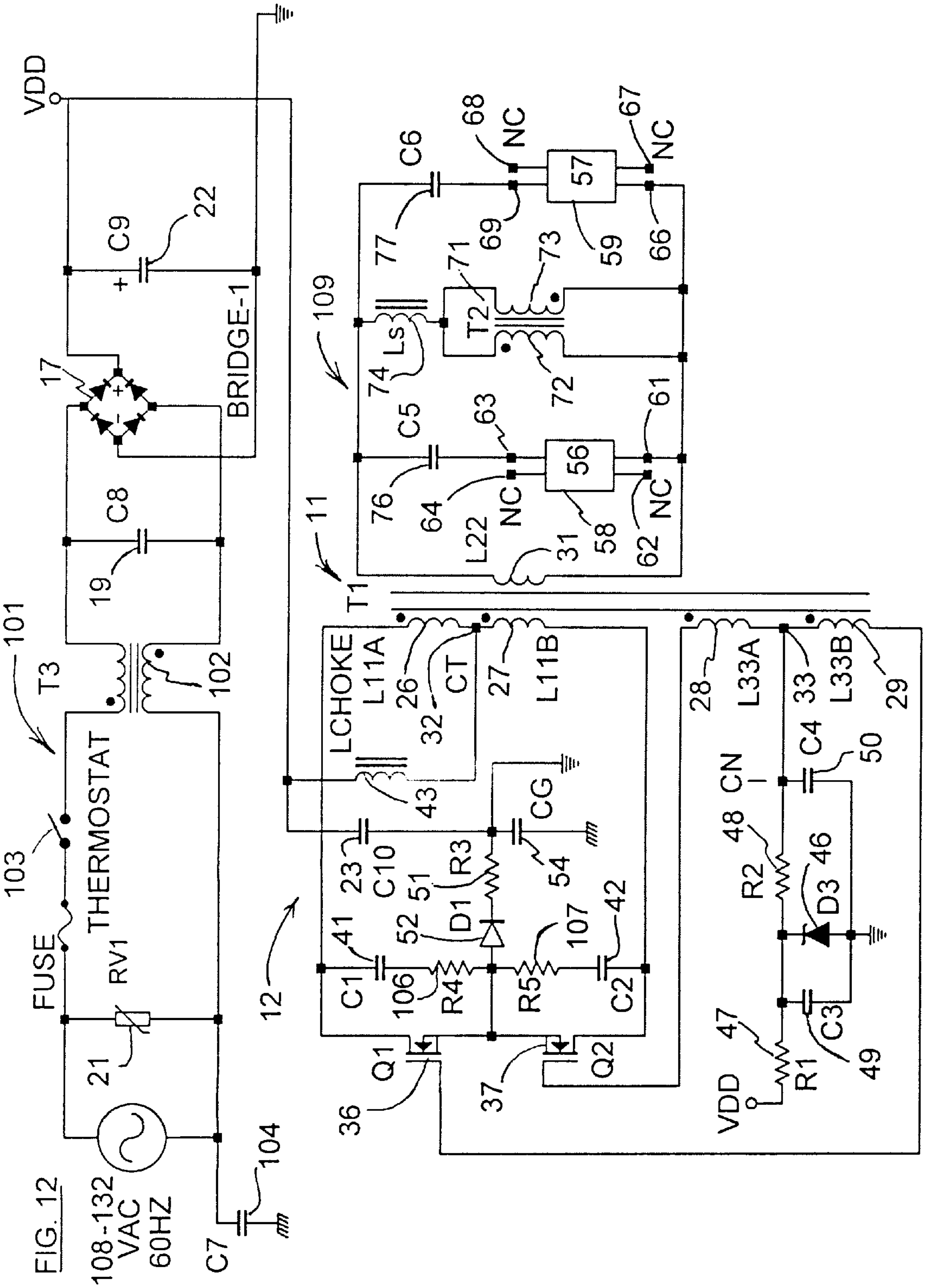

The embodiment of FIG. 12 includes a power supply 101 which is generally similar to power supply 16 in the embodiment of FIG. 1, and like reference numerals designate corresponding elements in the two embodiments. In the power supply of FIG. 12, however, a differential transformer 102 replaces inductor 18, and a thermostat 103 is connected in series with the fuse. A high frequency bypass capacitor 104 is connected between one of the power lines and the chassis ground. That capacitor is shown as being connected to the neutral conductor, but it can be connected to the line conductor instead, if desired.

The amplifier section of the embodiment of FIG. 12 is similar to that of FIG. 9, and like reference numerals designate corresponding elements in the two embodiments. In FIG. 12, damping resistors 106, 107 are connected in series with capacitors 41, 42. These resistors absorb non-linear high frequency noise and thereby enhance the stability of the amplifier during the start-up mode. In the embodiments of FIGS. 1, 8 and 11, the combined impedances of resistor 51 and diodes 52, 53 provide sufficient damping for the primary resonant tank circuit, and additional damping resistors are not required.

The embodiment of FIG. 12 also differs from that of FIG. 9 in that capacitor 54 is moved to the primary side of transformer 11 and connected between the primary circuit ground and an earth ground. Having this capacitor on the primary side of the transformer results in a significant reduction in the amount electromagnetic interference (EMI) which is coupled to the power lines.

The ballasting network 109 in the embodiment of FIG. 12 is intended for use with rapid-start lamps operating in an instant-start mode. This network differs from the ballasting network in the embodiment of FIG. 1 in that lamp terminals 61, 66 are connected directly to the lower end of the secondary winding 31 of transformer 11, and terminals 62, 67 are left unconnected. Since the terminals of rapid-start lamps are not connected together internally like the terminals of instant-start lamps, the lower ends of the two windings 72, 73 of differential transformer 71 are connected directly to the lower end of winding 31, rather than being connected through the terminals of the lamps as they are in the embodiment of FIG. 1. With either one lamp, two lamps or no lamps connected in the circuit, ballasting network 109 has the same electrical characteristics as the network of FIG. 1.

Figure 13:
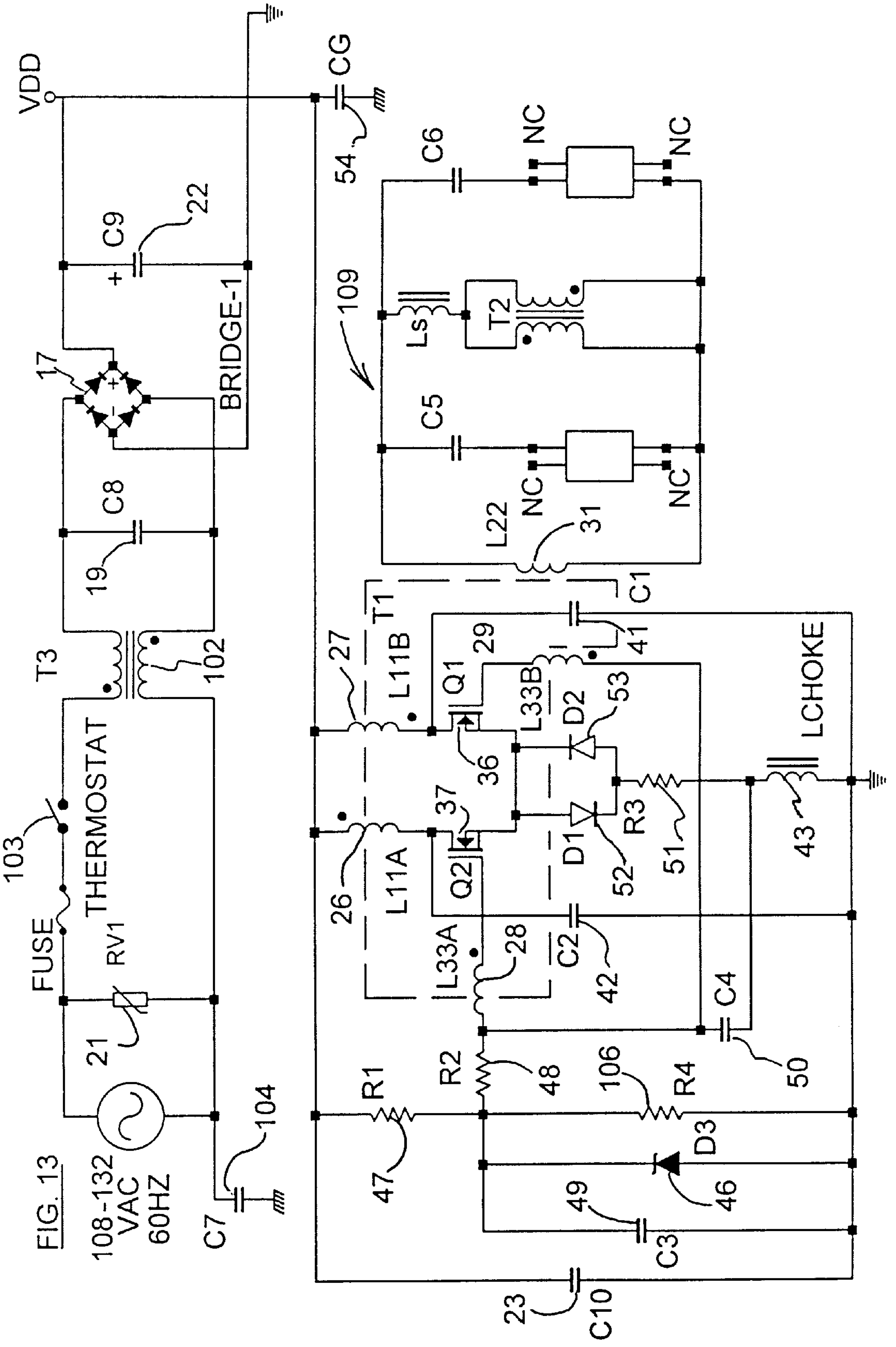

The embodiment of FIG. 13 has a primary system which is similar to that in the embodiment of FIG. 1 and a ballast network similar to network 109 in the embodiment of FIG. 12, with like reference numerals once again designating corresponding elements in the various embodiments. The embodiment of FIG. 13 differs from the others, however, in that RF choke 43 is connected between resistor 51 and the circuit ground, and the lower end of capacitor 50 is connected to the junction of the resistor and the choke. In this embodiment, the primary windings 26, 27 are also tightly coupled together to enhance waveshape symmetry and to reduce the leakage flux field between them.

Figure 14B:
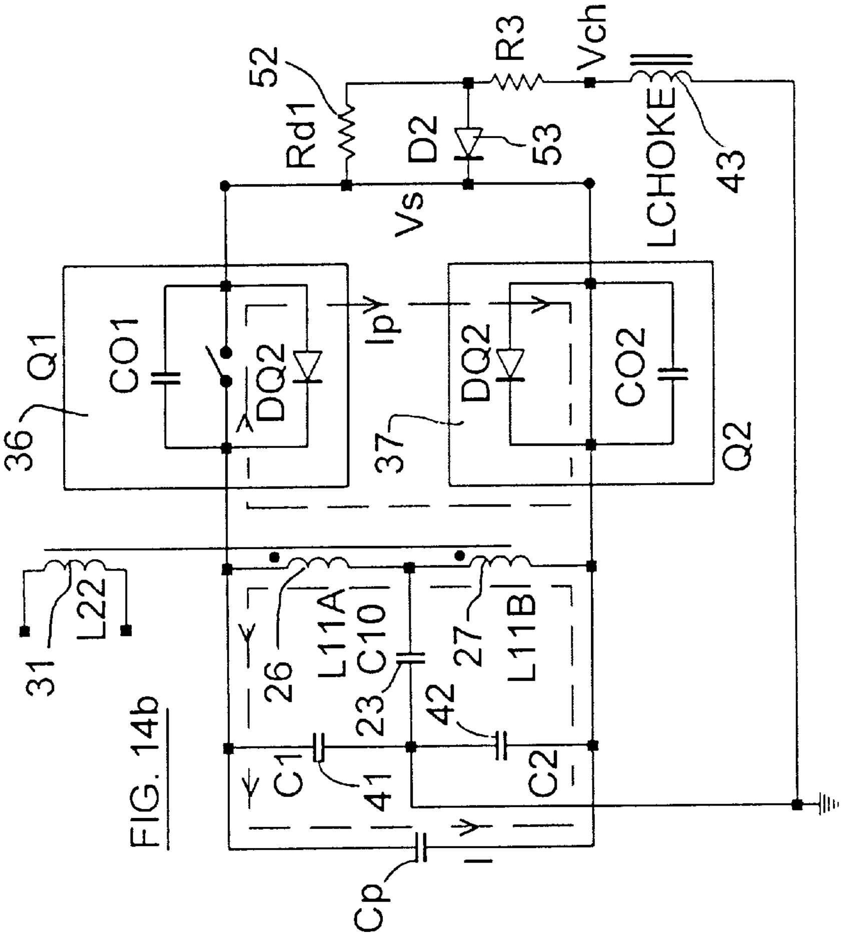
FIGS. 14*a* and 14*b* are AC equivalent circuits of the primary section of the embodiment of FIG. 13.
Figure 14A:
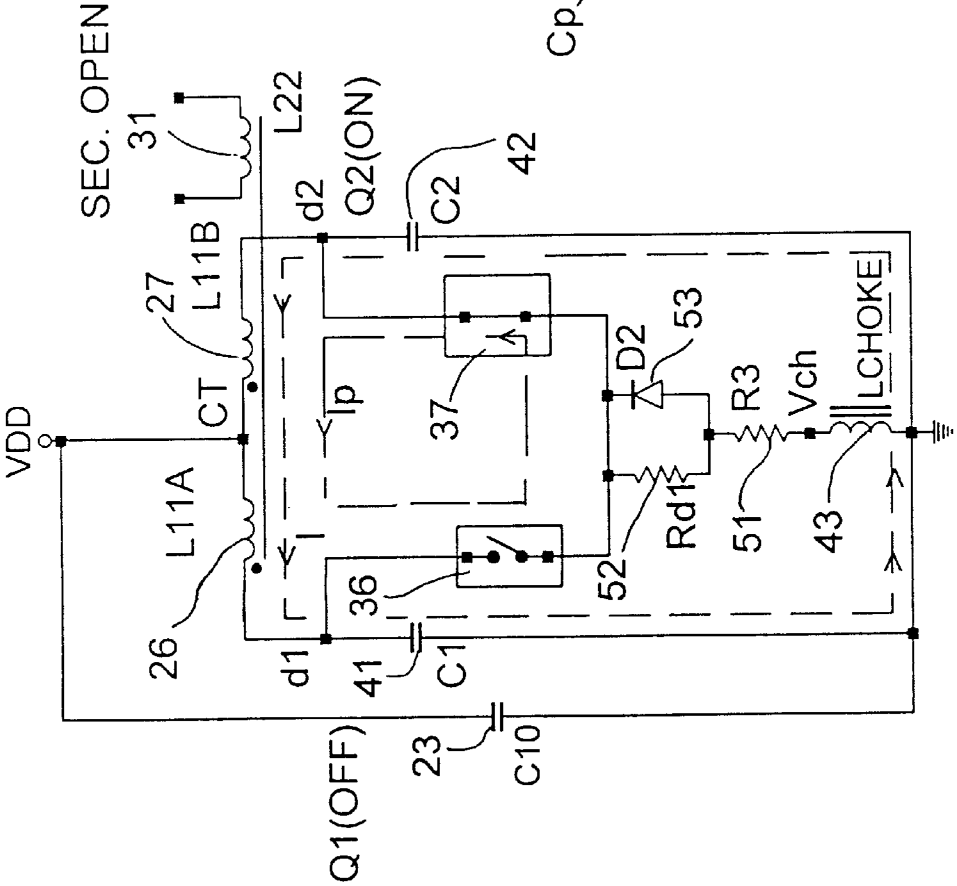
Figure 15:
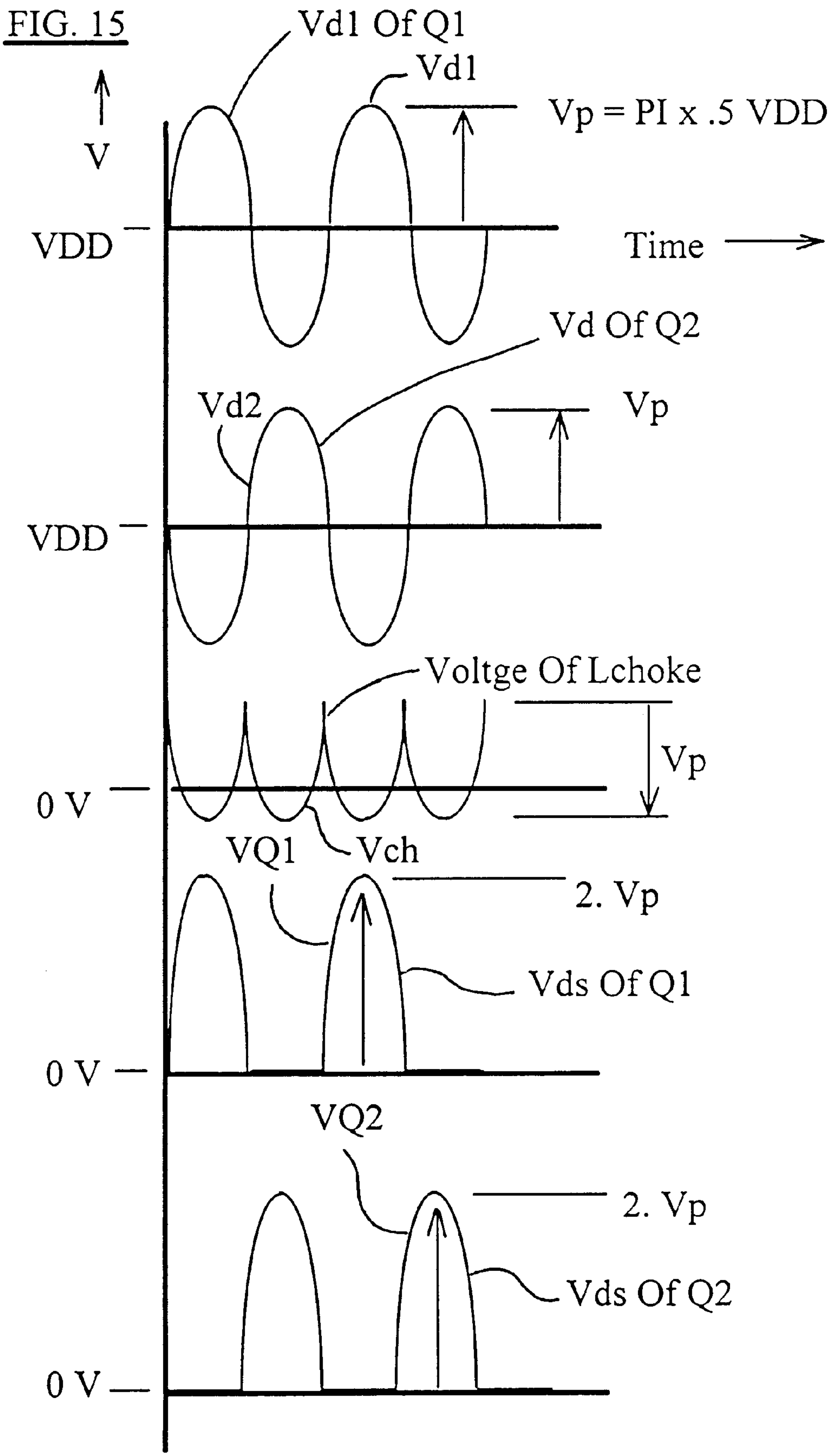
FIG. 15 is a set of waveform diagrams of the voltages at certain points in the embodiment of FIG. 13.

AC equivalent circuits of the primary system in the embodiment of FIG. 13 are shown in FIGS. 14*a* and 14*b*, and voltage waveforms are shown in FIG. 15. These figures show two separate current loops for currents I and $I_p$. With transistor 37 (Q2) conducting, the loop for the current I comprises primary windings 26, 27, capacitor 41 (C1) and transistor 37 (Q2). With transistor 36 (Q1) conducting, the loop for current I comprises the primary windings, capacitor 42 (C2) and transistor 36 (Q1). Current $I_p$ is a parasitic current which flows around a loop which includes the primary windings and the parasitic output capacitance $C_{O1}$ or $C_{O2}$ of the nonconducting (OFF) transistor 36, 37.

Since the parasitic output capacitances of the transistors are much smaller than the values of capacitor 41 (C1) and capacitor 42 (C2), their effect on the natural frequency of the oscillator is minimal. The natural frequency of the primary system is given by the relationship $$\frac{1}{2\pi\sqrt{L_{11}\cdot C}}$$

where $L_{11}$ is the total inductance of the primary windings and C is given by the relationship $$C = C_p + C_{01} + \frac{1}{\frac{1}{C1} + \frac{1}{C2}}$$

or by the relationship $$C = C_p + C_{02} + \frac{1}{\frac{1}{C1} + \frac{1}{C2}}$$

depending upon which transistor is conducting. $C_p$ is the parasitic capacitance of all of the power transformer windings combined, including the secondary winding 31.

As illustrated in FIG. 15, the choke voltage $V_{ch}$ is inverted, as compared with the embodiment of FIG. 1, and that voltage is a negative-going full-wave rectified sinusoid which is approximately equal to the voltage across the capacitor C1 or C2 in the active current loop. The drain voltages $V_{d1}$ and $V_{d2}$ of transistors 36 (Q1) and 37 (Q2) are sinusoidal and have a peak-to-peak value of $\pi \cdot V_{DD}$. The drain-source voltages across the transistor ($V_{Q1}$ and $V_{Q2}$) is equal to the total voltage across the two primary windings.

This embodiment has a significant advantage in that the natural frequency is determined primarily by the series combination of capacitors 41 (C1) and 42 (C2) so that the two capacitors do not have to be made equal in value in order to have waveform symmetry across the primary windings. In addition, the high voltage across the primary windings and at the two drain nodes is sinusoidal, which minimizes harmonics and RF radiation to the environment.

Figure 16:
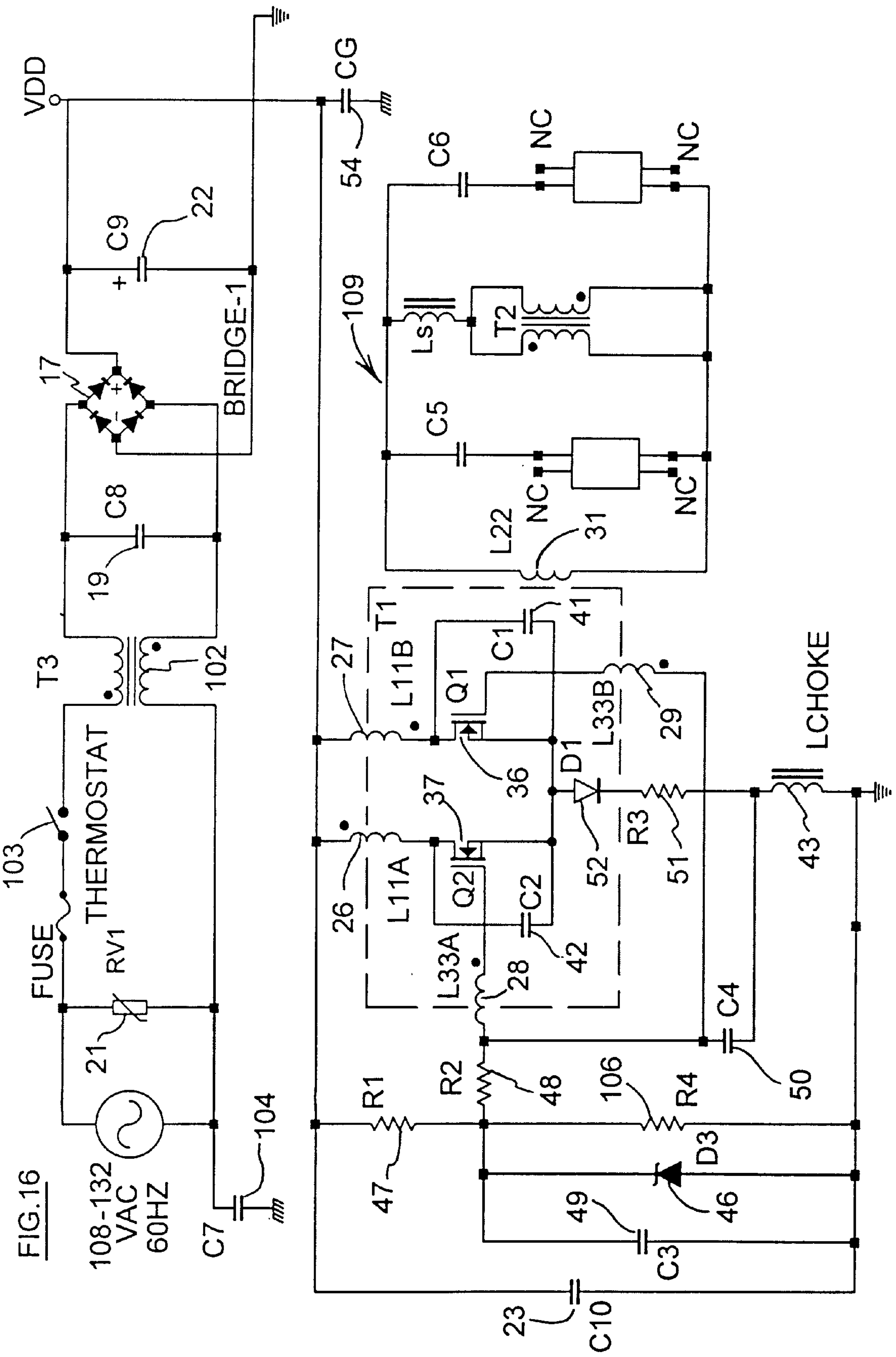
FIG. 16 is a circuit diagram of another embodiment of an electronic ballast system according to the invention.

The embodiment shown in FIG. 16 is similar to the embodiment of FIG. 13 except tuning capacitors 41, 42 are connected directly between the drains and the sources of switching transistors 36, 37 in a manner similar to the embodiment of FIG. 9, and only a single diode 51 is connected between resistor 53 and the sources of the transistors.

Figure 17B:
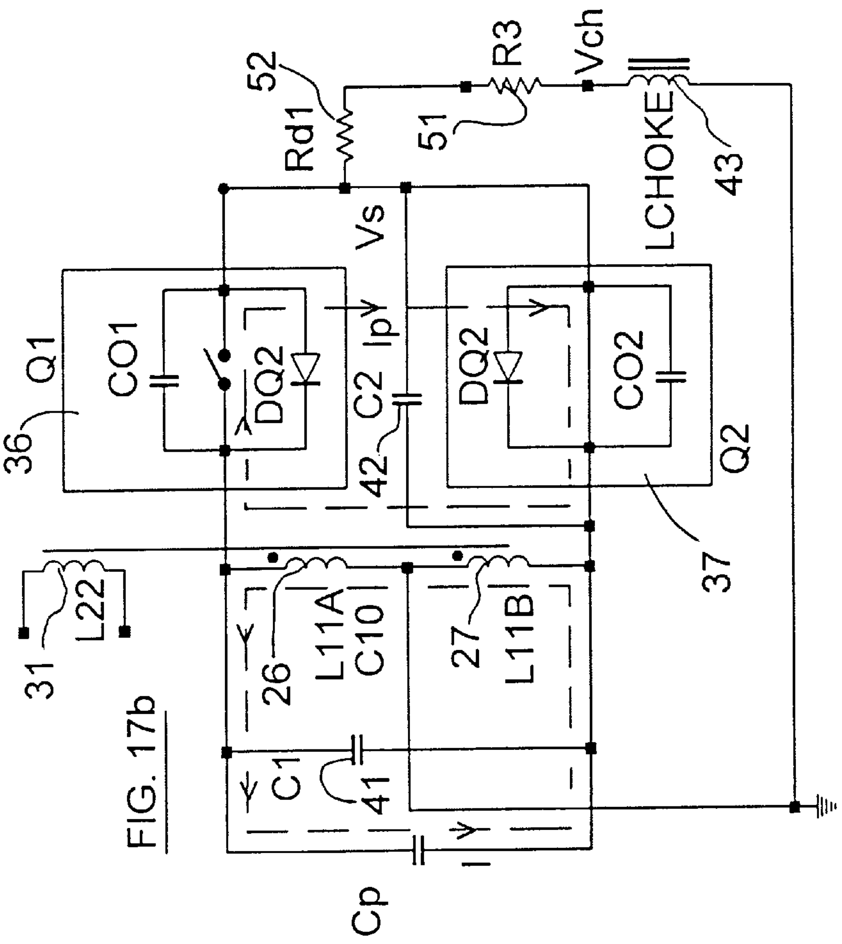
FIGS. 17*a* and 17*b* are AC equivalent circuits of the primary section of the embodiment of FIG. 16.
Figure 17A:
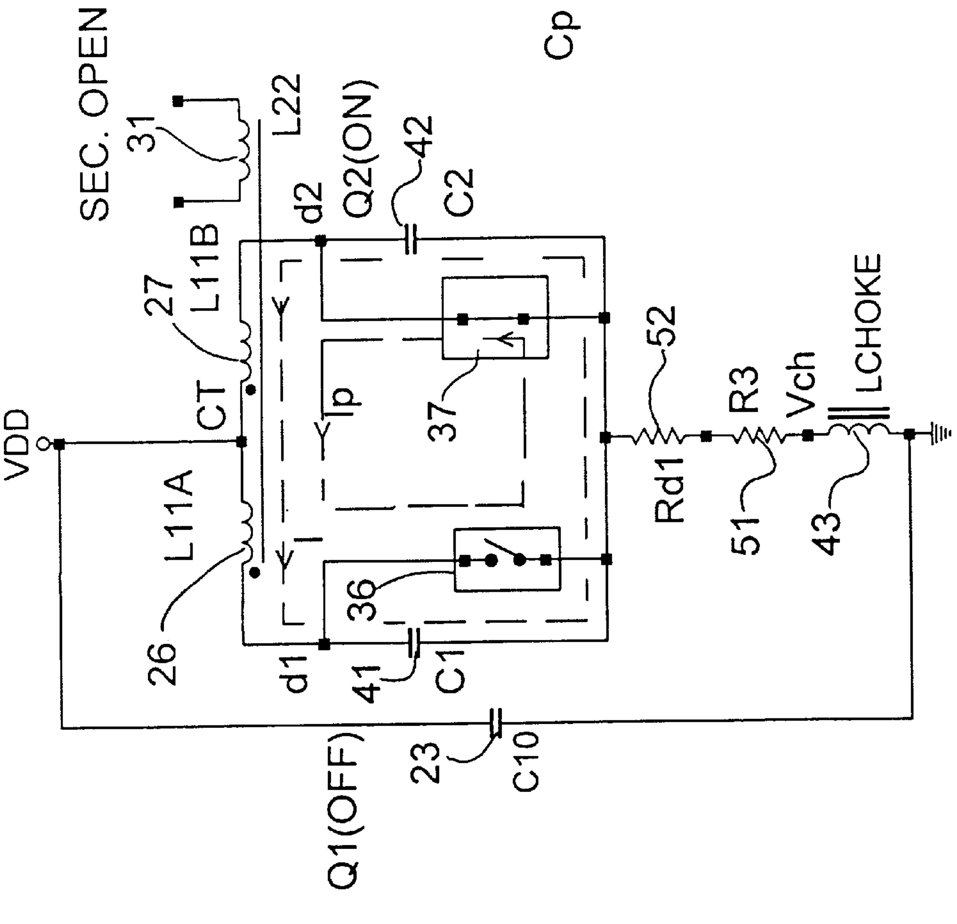

As illustrated in the AC equivalent circuits of FIGS. 17*a* and 17*b*, the primary current I flows around a loop comprising primary windings 26, 27, the conducting transistor (Q1 or Q2) and the capacitor (C1 or C2) connected across the nonconducting transistor. A parasitic current $I_p$ flows around a loop comprising the primary windings the output capacitance ($C_{O1}$ or $C_{O2}$) of the nonconducting transistor, and the conducting transistor (Q1 or Q2).

In this embodiment, the effect of the output capacitances $C_{O1}$, $C_{O2}$ is relatively small and can be ignored in determining the natural frequency of the primary circuit in accordance with the relationship $$\frac{1}{2\pi\sqrt{L_{11} \cdot C}}$$

where $L_{11}$ is the total inductance of the primary windings, $C=C_p+C1$, $C1=C2$, and $C_p$ is the parasitic capacitance of all of the power transformer windings combined, including the secondary winding 31.

The voltage waveforms in the primary circuit of the embodiment of FIG. 16 are similar to those shown in FIG. 15 for the embodiment of FIG. 13.

Figure 18:
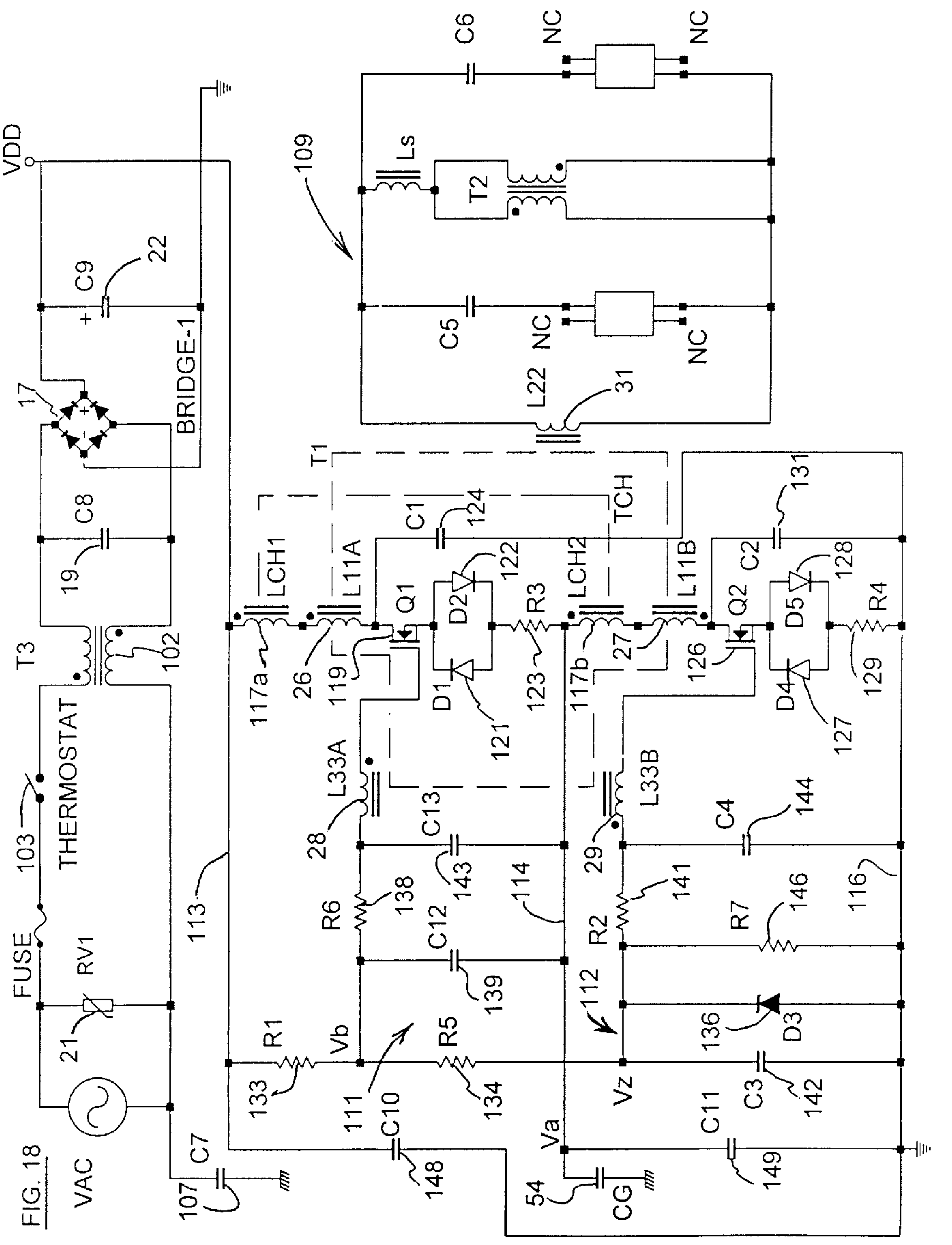
FIG. 18 is a circuit diagram of another embodiment of an electronic ballast system according to the invention.

FIG. 18 illustrates an embodiment in which two amplifier circuits 111, 112 are stacked in the primary system to provide a power oscillator having a split power supply in which each switching device sees only one-half of the rectified DC voltage. This is advantageous because it enables the system to operate on higher supply voltages (e.g., 220, 277 or 347 volts AC) without relatively expensive switching transistors with higher breakdown voltages. For example, a 120 VAC system requires 600 volt transistors, whereas a 277 VAC system requires 1300 volt transistors, which are substantially more expensive and not always available.

One of the stacked circuits is connected between voltage nodes 113 and 114, and the other is connected between voltage node 114 and ground node 116. The voltage at node 113 is the supply voltage $V_{DD}$, and the voltage at node 114 is approximately equal to one-half of the supply voltage. The ground node is connected to the circuit ground.

In the embodiment of FIG. 18, the two stacked amplifier circuits are similar to the amplifier circuit in the embodiment of FIG. 1. These circuits include a choke transformer 117 which has a pair of tightly coupled, in-phase windings 117*a*, 117*b* of equal inductance. This transformer provides an RF choke impedance for each of the stacked amplifiers and a unity impedance transformation between them. The primary windings 26, 27 of the power transformer are separated but coupled tightly to each other, rather than being connected together to form a center tap as they are in the embodiment of FIG. 1.

In circuit 111, choke winding 117 a and primary winding 26 are connected between voltage node 113 ($V_{DD}$) and the drain of a MOSFET switching transistor 119. Back-to-back diodes 121, 122 and a resistor 123 are connected between the source of this transistor and voltage node 114 ($V_a$). A capacitor 124 is connected between the drain of the transistor and the ground node.

In circuit 112, choke winding 117*b* and primary winding 27 are connected between voltage node 114 ($V_a$) and the drain of a MOSFET switching transistor 126. Back-to-back diodes 127, 128 and a resistor 129 are connected between the source of transistor 126 and the ground node, and capacitor 131 is connected between the drain of the transistor and the ground node. Resistor 129 and capacitor 131 are equal in value to resistor 123 and capacitor 124.

Biasing voltages for the switching transistors are developed across resistors 133, 134 and a Zener diode 136 which are connected in series between voltage node 113 and ground node 116. The resistors serve as a voltage divider which provides a biasing voltage $V_b$ for circuit 111, with the Zener voltage $V_z$ being applied to circuit 112. With resistors of equal value, voltage $V_b$ is midway between the supply voltage $V_{DD}$ and the Zener voltage $V_z$. Since the Zener voltage is constant, the voltage $V_b$ is also relatively constant during steady operating conditions.

Voltage $V_b$ is applied to one end of drive winding 28 by a low-pass filter consisting of a resistor 138 and a capacitor 139, and the other end of the drive winding is connected to the gate of transistor 119. Biasing voltage $V_z$ is applied to one end of drive winding 29 by a low-pass filter consisting of a resistor 141 and a capacitor 142, and the other end of this drive winding is connected to the gate of transistor 126. AC bypass capacitors 143, 144 are connected between the outputs of the low-pass filters and low voltage nodes 114, 116, respectively.

In addition to providing to providing substantially constant biasing voltages at the gates of the transistors under steady-state conditions, the Zener diode also serves to stabilize the power oscillator during start-up by providing a soft start. The current vs. voltage (I–V) characteristic of a Zener diode is logarithmic at low current levels, and during start-up, the Zener diode operates in the logarithmic region to provide a voltage which is slightly greater than the voltage required to turn on the transistors. The gate voltages rise slowly and prevent a fast rise of the drain currents. Since the gain of the amplifiers depends on the drain currents, the amplitude of the oscillation increases logarithmically.

A resistor 146 is connected in parallel with the Zener diode to reduce the effect of variations in the current-voltage characteristics of Zener diodes from different manufacturers. The resistor desensitizes the system to changes in the dynamic impedance of the Zener diode which varies inversely with the reverse current through the diode.

AC bypass capacitors 148, 149 are connected between voltage nodes 113, 114 and the circuit ground.

As in the embodiment of FIG. 1, other types of switching transistors can be utilized in the amplifier circuits of FIG. 18. With bipolar junction transistors, for example, the values of resistors 138, 141 are selected to make the base currents of the transistors much smaller than the DC currents through resistors 133, 134. Diodes should also be connected between the collectors and emitters of the bipolar transistors to provide reverse current paths across the transistors during their OFF states. The anodes of the diodes are connected to the emitters, and the cathodes are connected to the collectors.

The voltage provided to each of the stacked circuits will be quite close to one half of the supply voltage (i.e., $V_{DD}/2$) even though the switching transistors may not be perfectly matched. With power MOSFET transistors, for example, there will most likely be a mismatch in the gate-to-source turn-on voltage, and with bipolar transistors, there will be a mismatch of gain or β between transistors. As long as the gate-source DC biased, voltage of the MOSFET transistor (or $V_{BE}$ when BJT's are employed) and the voltage drops across the diode(s) and resistors R3, R4 are much smaller than the supply voltage, voltage $V_a$ will be substantially equal to voltage $V_{DD}$. With transistors of equal AC transconductance and a common DC biased drain current, the AC gains of the two amplifier circuits are substantially identical in the linear operating region.

Figure 19B:
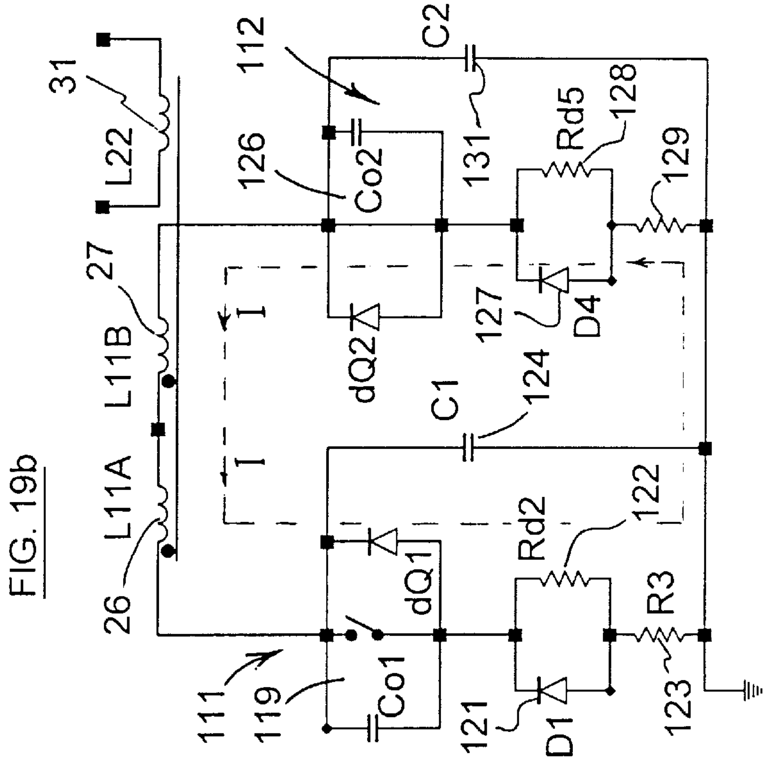
FIGS. 19*a* and 19*b* are AC equivalent circuits of the primary section of the embodiment of FIG. 18.
Figure 19A:
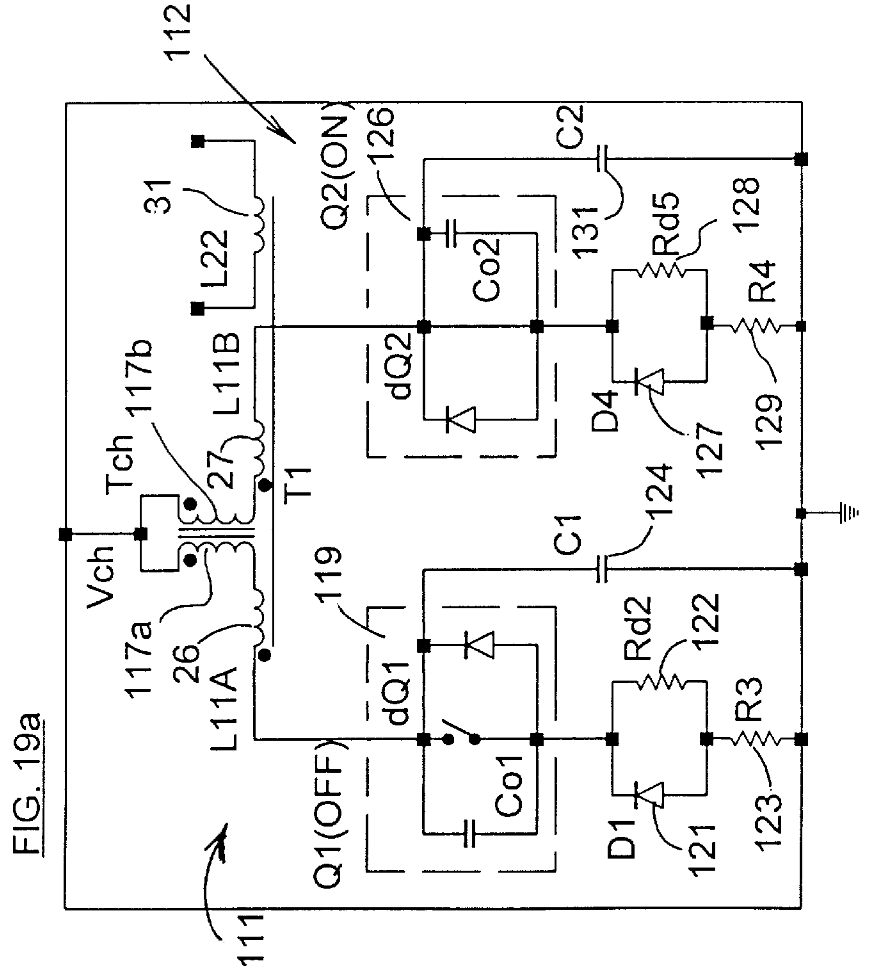
Figure 20:
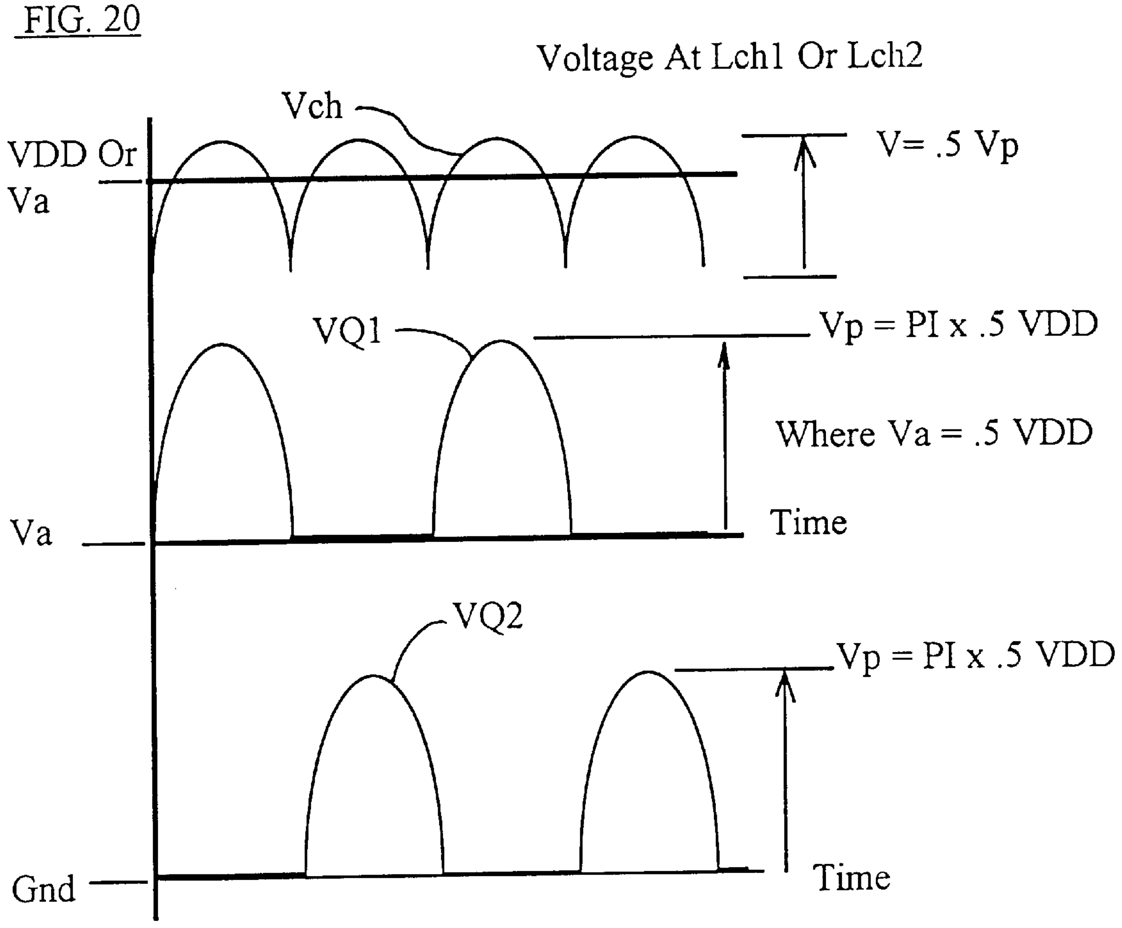
FIG. 20 is a set of waveform diagrams of the voltages at certain points in the embodiment of FIG. 18.

As illustrated in the AC equivalent circuits of FIGS. 19*a* and 19*b*, choke transformer 117 acts as a dead short between the primary windings 26, 27, and the active amplifier (amplifier 111 in these figures) is transformed from one choke terminal to the other. The voltage waveforms of the two amplifier circuits are as shown in FIG. 20, where $V_{ch}$ is the voltage of either choke winding 117*a* or choke winding 117*b*, and $V_{Q1}$ and $V_{Q2}$ are the drain-to-source voltages of transistors 119, 126. The natural frequency is given by the relationship $$\frac{1}{2\pi\sqrt{L_{11}\cdot C}}$$

where $L_{11}$ is the total inductance of the primary windings and $C=C1+C_p+C_{O1}$ or $C1=C2+C_p+C_{O2}$, depending upon which transistor is conducting. C1 and C2 are the capacitances of capacitors 124 and 131, and $C_P$ is the parasitic capacitance of all of the power transformer windings combined, including the secondary winding 31.

Figure 21:
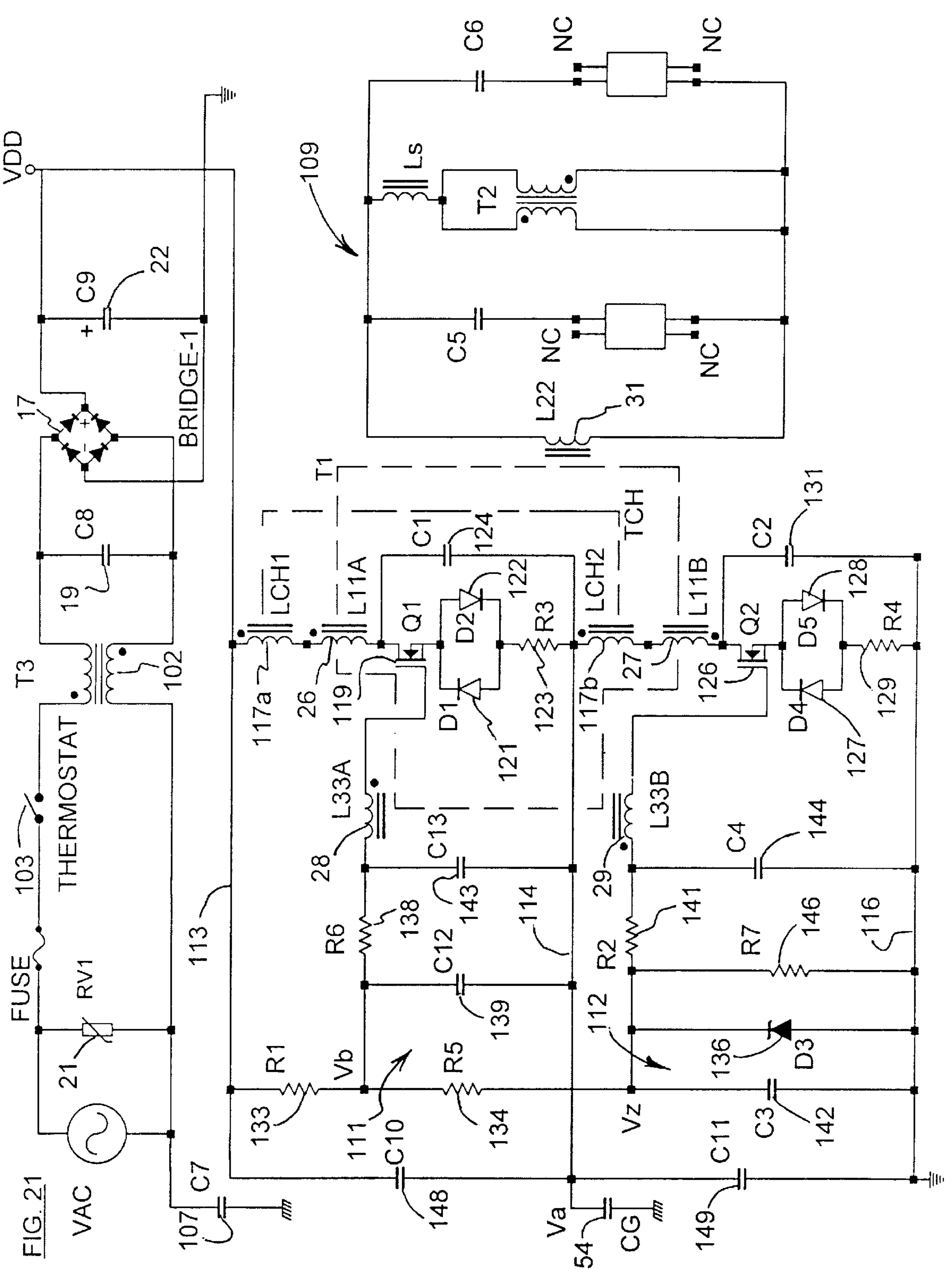
FIGS. 21 and 22 are circuit diagrams of additional embodiments of an electronic ballast system according to the invention.

The embodiment of FIG. 21 is similar to the embodiment of FIG. 18, except the lower end of tuning capacitor 124 is connected to voltage node 114 ($V_a$), rather than to the ground node, and the lower end of the AC bypass capacitor 148 is connected to voltage node 114, rather than to the ground node.

Figure 22:
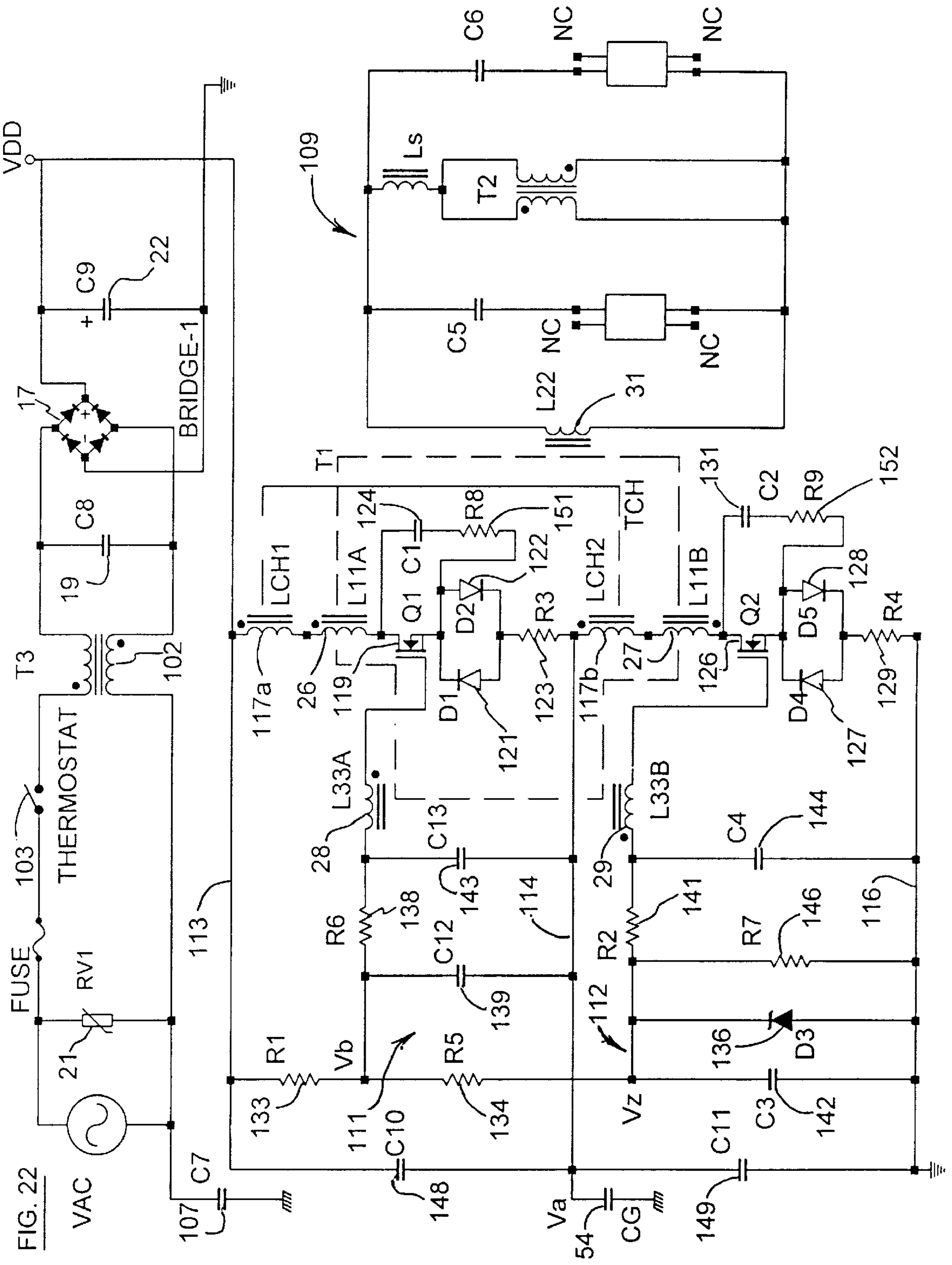

The embodiment of FIG. 22 is also generally similar to the embodiment of FIG. 18. In the embodiment of FIG. 22, however, the tuning capacitors 124, 131 are connected in series with resistors 151, 152 between the drains and sources of the transistors.

Figure 23:
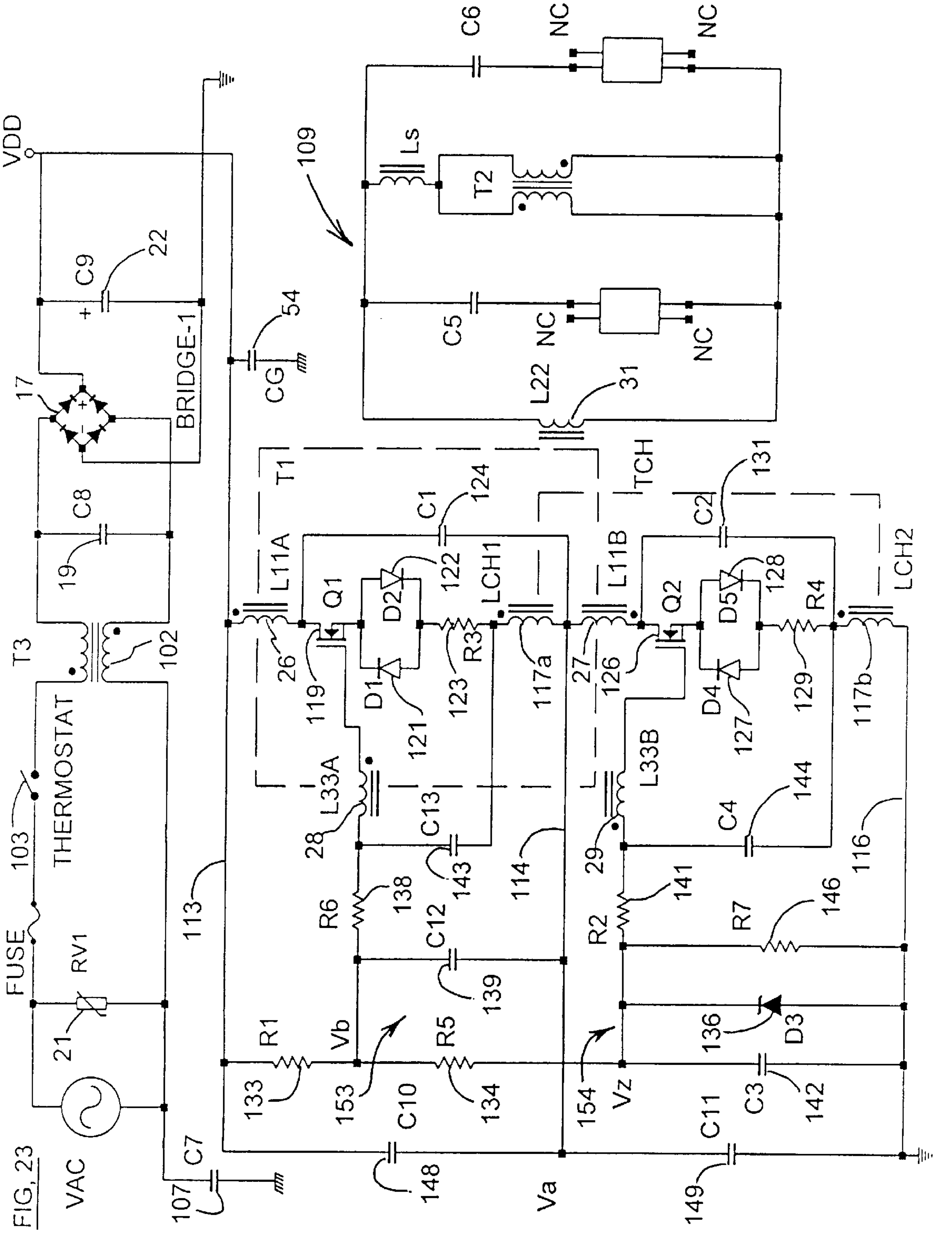
FIG. 23 is a circuit diagram of another embodiment of an electronic ballast system according to the invention.

FIG. 23 illustrates an embodiment similar to the embodiment of FIG. 18 but with amplifier circuits 153, 154 of the type shown in FIG. 13. In circuit 153, choke winding 117*a* is connected between resistor 123 and voltage node 114 ($V_a$), and the lower end of bypass capacitor 143 is connected to the junction of resistor 123 and the choke winding. In circuit 154, choke winding 117*b* is connected between resistor 129 and ground node 116, and the lower end of bypass capacitor 144 is connected to the junction of resistor 129 and the choke winding. Also, the lower end of bypass capacitor 148 is connected to voltage node 114 ($V_a$), rather than to the circuit ground, and grounding capacitor 54 is connected directly between the output of the power supply (voltage node 113 ) and the earth ground.

Figure 24B:
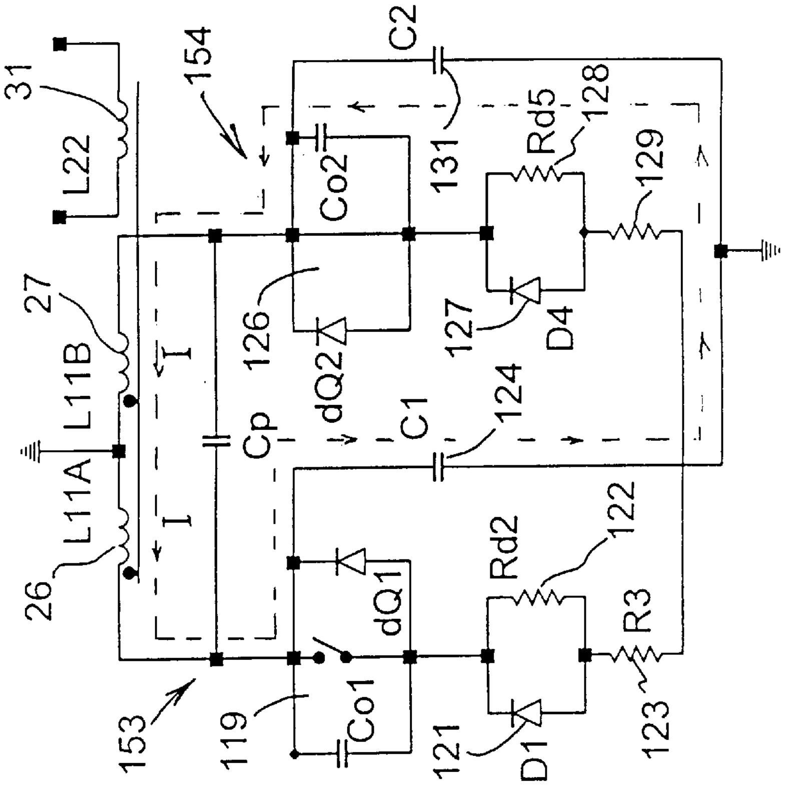
FIGS. 24*a* and 24*b* are AC equivalent circuits of the primary section of the embodiment of FIG. 23.
Figure 24A:
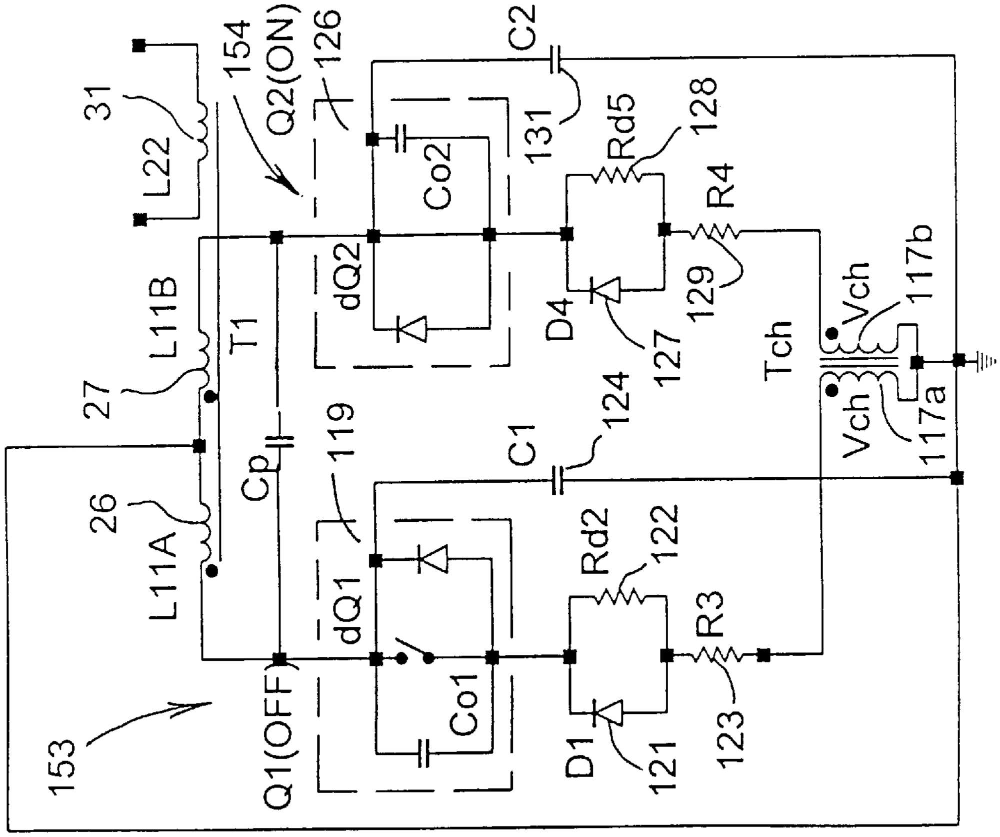

Transistor 126 (Q2) is shown in the conducting state in the AC equivalent circuits of FIGS. 24*a* and 24*b*. In this state, the main primary current I flows around a loop comprising transformer windings 26, 27, capacitor 124 (C1), capacitor 131 (C2), and the parasitic capacitance $C_p$. In this embodiment, the natural frequency is given by the relationship $$\frac{1}{2\pi\sqrt{L_{11}\cdot C}}$$

where $L_{11}$ is the total inductance of the primary windings, $$C=\frac{1}{\frac{1}{C1}+\frac{1}{C2}}=C_p$$

and $C_p$ is the parasitic capacitance of the transformer windings. In this embodiment, capacitors 124 and 131 do not have to have equal values.

Figure 25:
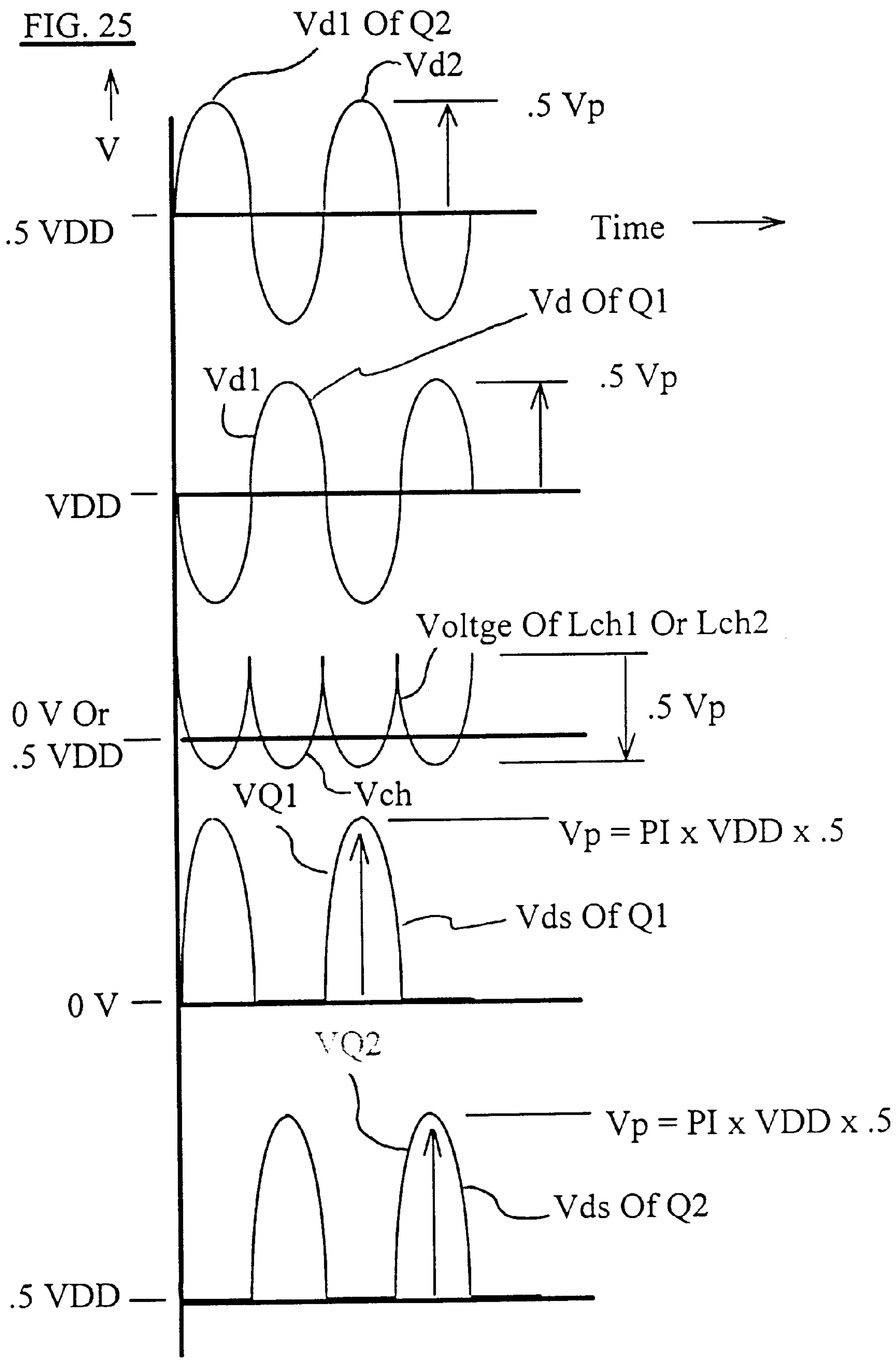
FIG. 25 is a set of waveform diagrams of the voltages at certain points in the embodiment of FIG. 23.

Voltage waveforms for the embodiment of FIG. 23 are shown in FIG. 25, with $V_{d1}$ and $V_{d2}$ being the drain voltages of transistors 119 (Q1) and 126 (Q2), $V_{ch}$ being the voltage on either choke winding 117*a* or choke winding 117*b*, and $V_{Q1}$ and $V_{Q2}$ being the drain-to-source voltages of the transistors.

Figure 26:
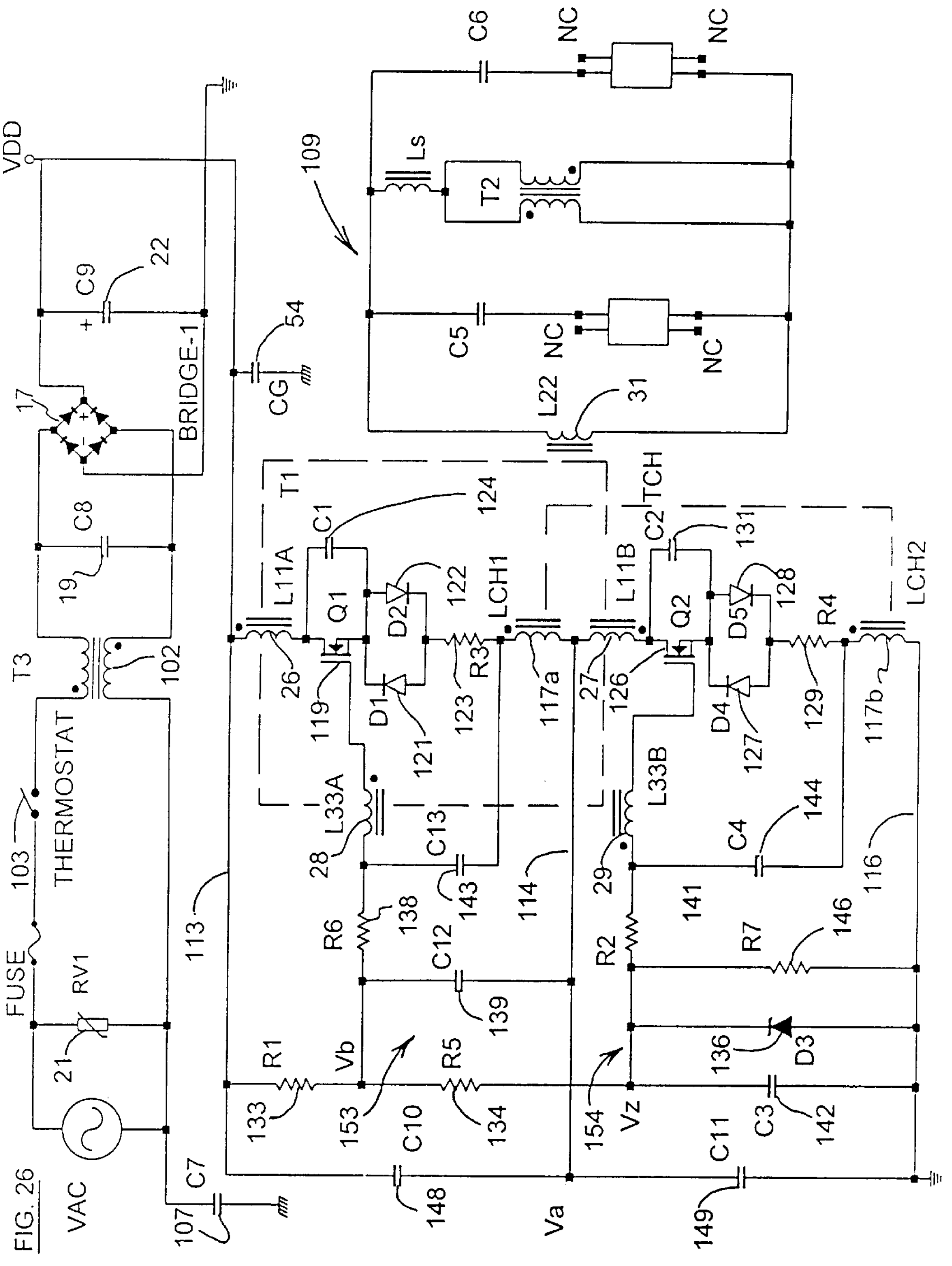
FIG. 26 is a circuit diagram of another embodiment of an electronic ballast system according to the invention.

FIG. 26 illustrates another embodiment in which the choke windings 117*a* and 117*b* are positioned between the source resistors 123, 129 and lower voltage nodes 114, 116 in the stacked circuits. This embodiment differs from the embodiment of FIG. 23 in that the tuning capacitors 124, 131 are connected between the drains and the sources of the transistors.

Figure 27B:
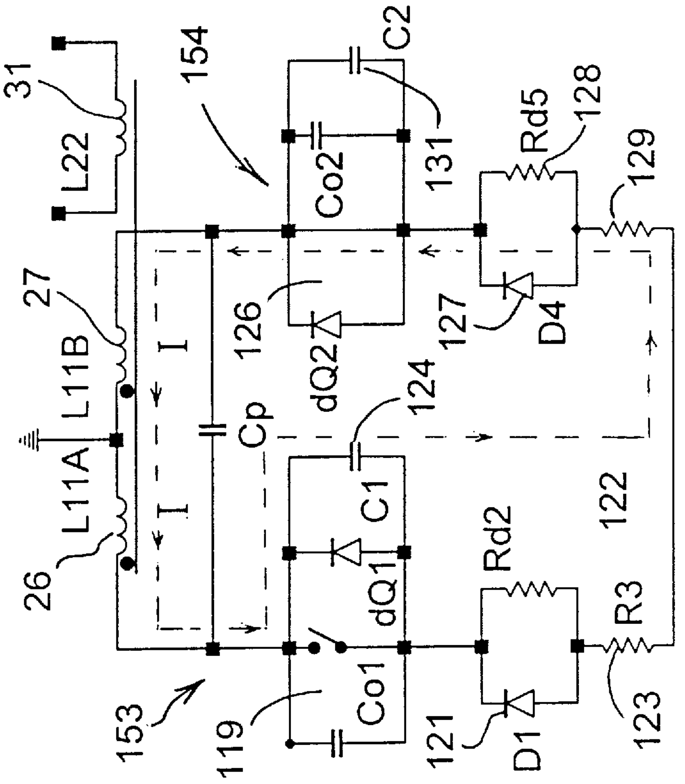
FIGS. 27*a* and 27*b* are AC equivalent circuits of the primary section of the embodiment of FIG. 18.
Figure 27A:
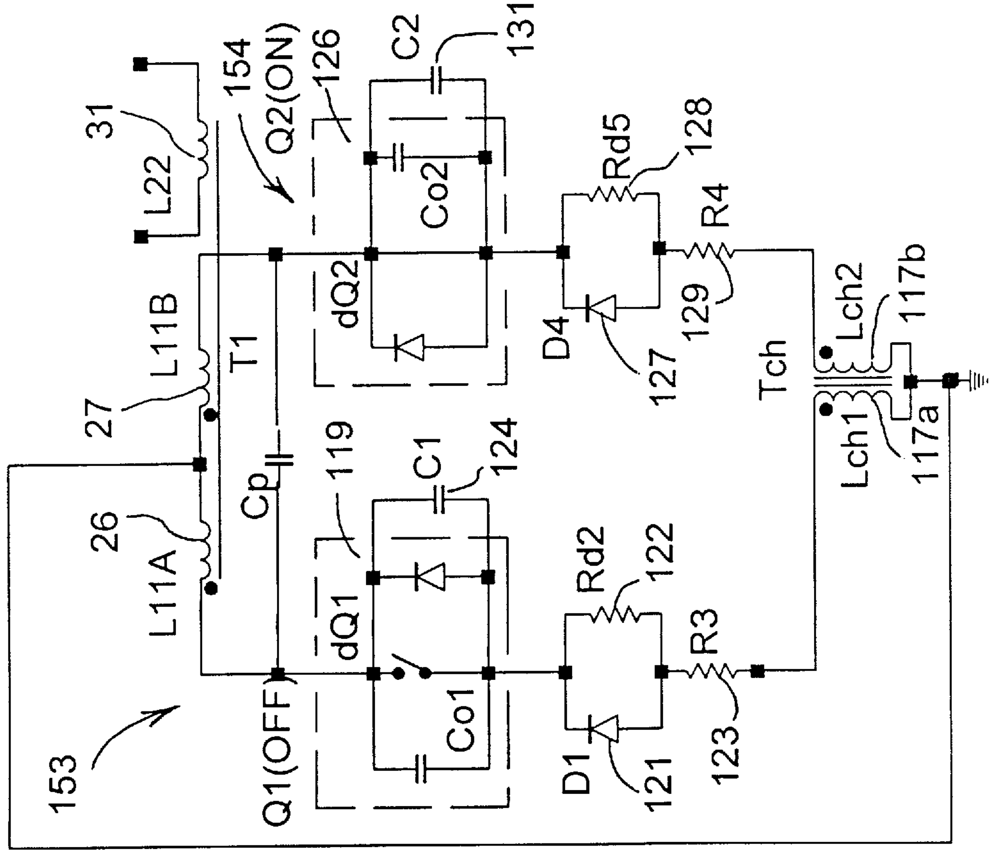

As illustrated in the AC equivalent circuits of FIGS. 27*a* and 27*b*, choke transformer 117 once again provides a short circuit for the primary current I, and the summation of the choke winding voltages is zero. The natural frequency of this embodiment is $$\frac{1}{2\pi\sqrt{L_{11}\cdot C}}$$

where $L_{11}$ is the total inductance of the primary windings and $C=C1+C_p$ or $C=C2+C_p$, depending upon which transistor is conducting. In this embodiment, the values of capacitors 124 (C1) and 131 (C2) are equal, and $C_p$ is the parasitic capacitance of the transformer windings. The voltage waveforms in this circuit are similar to the ones shown in FIG. 25.

Figure 28:
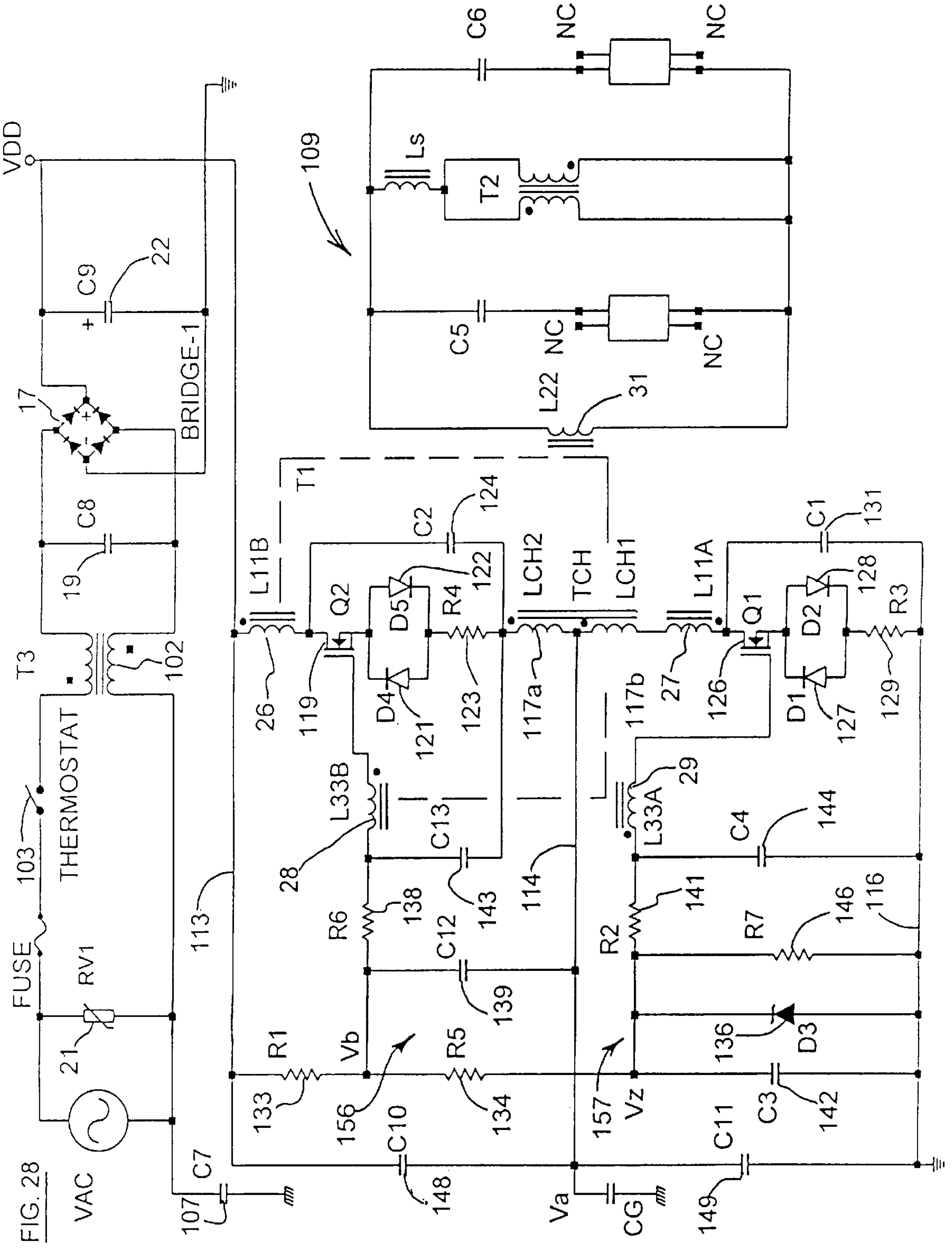
FIG. 28 is a circuit diagram of another embodiment of an electronic ballast system according to the invention.

FIG. 28 illustrates an embodiment which is similar to that shown in FIG. 21 but has stacked amplifier circuits 156, 157 with the choke windings connected at different points in the two circuits. In circuit 156, choke winding 117*a* is connected between resistor 123 and voltage node 114 ($V_a$) in the source circuit of transistor 119, and the lower end of capacitor 143 is connected to the junction of the choke winding and the resistor. In circuit 156, choke winding 117*b* is connected between voltage node 114 ($V_a$) and primary winding 27 in the drain circuit of transistor 126.

Here again, with tight magnetic coupling between the choke inductors, an AC circulating current loop is formed during the ON/OFF cycles of the switching transistors. With transistor 119 ON and transistor 126 OFF, the loop comprises primary winding 26, bypass capacitor 148, choke winding 117*b*, primary winding 27, tuning capacitor 131, the output capacitance $C_{O1}$ of transistor 126, diode 128, resistor 129, bypass capacitor 149, choke winding 117*a*, resistor 123, diode 121, the AC impedance $R_{d5}$ of diode 122, and transistor 119. With transistor 126 ON and transistor 119 OFF, the loop comprises primary winding 27, choke winding 117*b*, bypass capacitor 148, primary winding 26, tuning capacitor 124, the output capacitance $C_{O2}$ of transistor 119, diode 122, resistor 123, choke winding 117*a*, bypass capacitor 149, resistor 129, diode 127, the AC impedance $R_{d2}$ of diode 128, and transistor 126.

Capacitors 124, 131 are matched in order to maintain symmetry of the sine wave across the primary windings of the power transformer, and the natural frequency is $$\frac{1}{2\pi\sqrt{L_{11}\cdot C}}$$

where $L_{11}$ is the total inductance of the primary windings and $C=C1+C_p+C_{O1}$ or $C1=C2+C_p+C_{O2}$, depending upon which transistor is conducting. C1 and C2 are the capacitances of capacitors 124 and 131, $C_{O1}$ and $C_{O2}$ are the output capacitances of transistors 119 and 126, and $C_p$ is the parasitic capacitance of the transformer windings.

Figure 29:
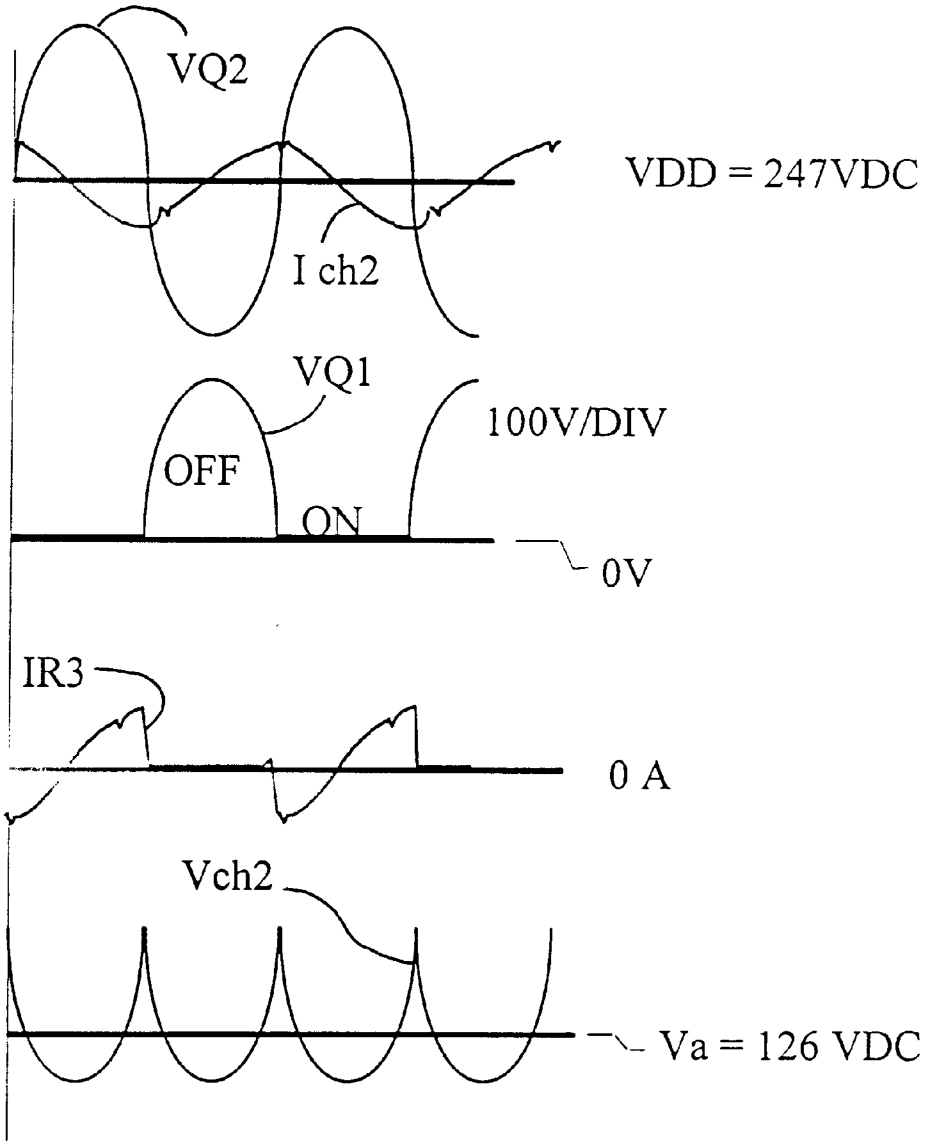
FIG. 29 is a set of waveform diagrams of the voltages and currents at certain points in the embodiment of FIG. 28.

Voltage and current waveforms at different points in the embodiment of FIG. 28 are illustrated in FIG. 29. In these waveforms, $V_{Q1}$ and $V_{Q2}$ are the drain-to-source voltages of transistors 119 and 126, $I_{R3}$ is the current through resistor 129, $V_{ch2}$ is the voltage at the top of choke winding 117*a*, and $I_{ch2}$ is the current through choke winding 117*a*.

Figure 30:
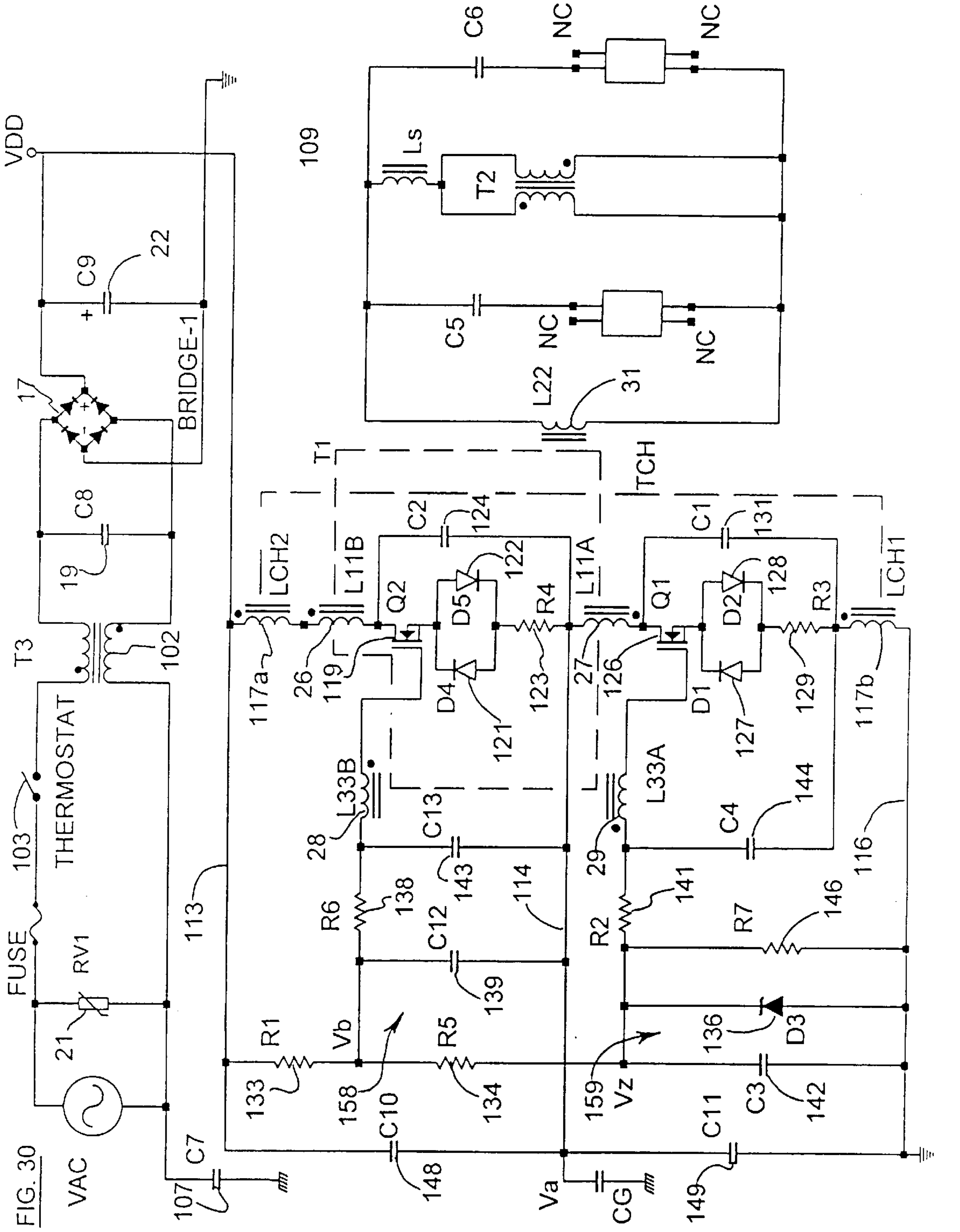
FIG. 30 is a circuit diagram of another embodiment of an electronic ballast system according to the invention.
Figure 32:
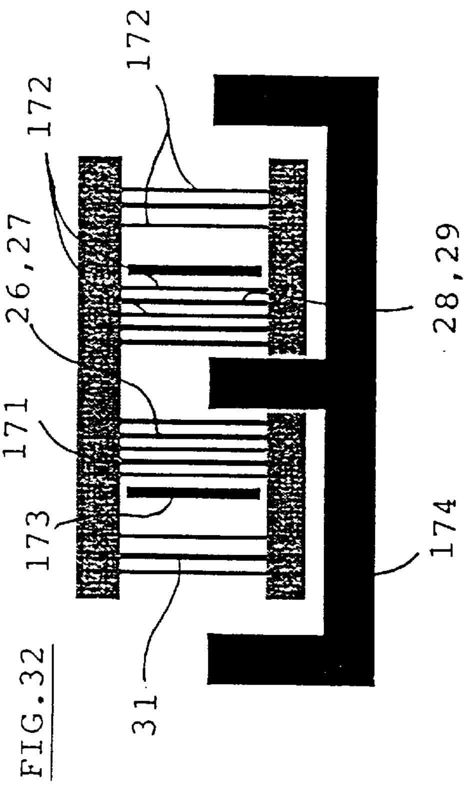
FIG. 32 is a cross-sectional view taken along line 32—32 of FIG. 31, with a portion of the core structure removed for clarity of illustration.

FIG. 30 illustrates another embodiment in which the choke windings are connected at different points in two stacked amplifier circuits. In circuit 158, choke winding 117*a* is connected between voltage node 113 ($V_{DD}$) and the upper end of primary winding 26, and in circuit 159, choke winding 117*b* is connected between resistor 129 and ground node 116. With the windings connected directly to the ±terminals of the DC supply, the choke transformer also functions as a high frequency noise suppressing, differential mode transformer which prevents RF noise generated during the transistor switching from being transmitted to the power lines. The AC circulating current loops and the natural frequency of this embodiment are similar to those of the embodiment of FIG. 28.

In the embodiments with the stacked circuits (i.e., FIGS. 18–30 ), if the values of resistors 133, 134 are large, dissipation of the power oscillator signal will be small, the low-pass filter in the biasing circuit without the Zener diode can be eliminated. Thus, capacitor 139 can be removed, and resistor 138 can be replaced with a short circuit so that the voltage $V_b$ and will be applied directly to drive winding 28.

In these embodiments, it is also possible to replace filter capacitor 22 with two capacitors of equal value connected in series between the output of the power supply and ground, with the junction of the two capacitors connected to voltage node 114 ($V_a$), i.e. one capacitor connected between voltage nodes 113, 114, and the other connected between voltage node 114 and ground node 116. Since each of those capacitors would have to handle only one-half of the supply voltage, their capacity can be made larger than that of capacitor 22. That provides a higher AC (e.g. 120 Hz) ripple current capability, which is important in extending the life of an electronic ballast.

FIGS. 31–35 illustrate a transformer construction which is particularly suitable for use in the ballast system of the invention. This construction substantially reduces the radiation of high frequency noise generated by magnetic flux switching in the transformer. Where the windings of a transformer are not completely shielded by the magnetic core, some high frequency E-field energy will usually escape and radiate to the nearby environment. Such energy is often coupled to power lines within the shielding enclosure of a system, conducted outside the enclosure and then radiated to the outside environment by the power lines.

Figure 31:
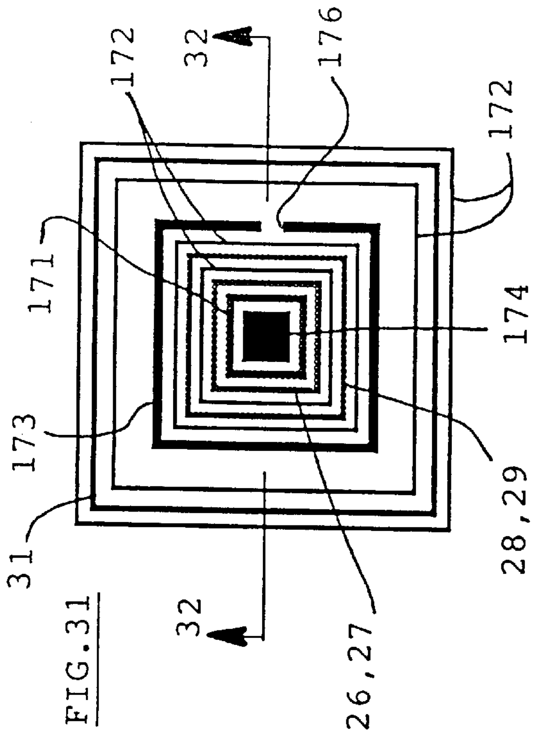
FIG. 31 is a cross-sectional view, somewhat schematic, of one embodiment of a transformer for use in the ballast system of the preceding figures.

In the embodiment of FIG. 31, the transformer has primary windings 26, 27 and gate drive windings 28, 29 wound on a bobbin 171. Secondary winding 31 is wound over the other windings, with layers of insulation 172 around the windings. An open loop metal shield 173 is positioned between the primary and secondary windings, and core pieces 174 are assembled about the winding structure to form a magnetic core.

Shield 173 is fabricated of an electrically conductive metal such as copper or aluminum, and is connected to the circuit ground for radio frequency E-field suppression. It encircles the primary windings and is in the form of an open loop with a gap 176 between confronting ends of the metal which forms the shield. In order to avoid high voltage arcing, the width of the shield is made equal to or less than the width of the windings, with narrower shields being used for higher voltages on the windings. One material which is economic and easy to use for the shield is an aluminum tape or a copper tape.

Figure 33:
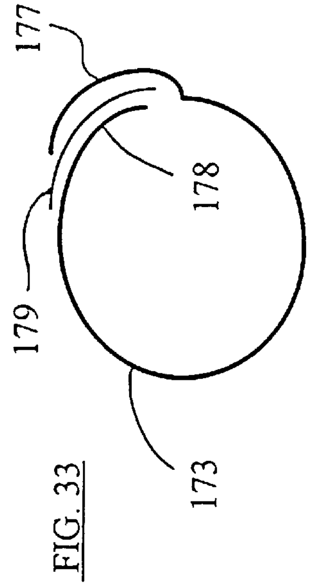
FIG. 33 is a cross-sectional view of another embodiment of a shield for use in the transformer of FIG. 31.

In the embodiment of FIG. 33, the shield 173 has overlapping end portions 177, 178, with a layer of insulation (e.g., electrically insulative tape) 179 positioned between the overlapping ends to maintain an open loop configuration. Although this shield is illustrated as having a generally circular cross-section, it can have any other configuration which is suitable for the transformer in which it is used.

Figure 34:
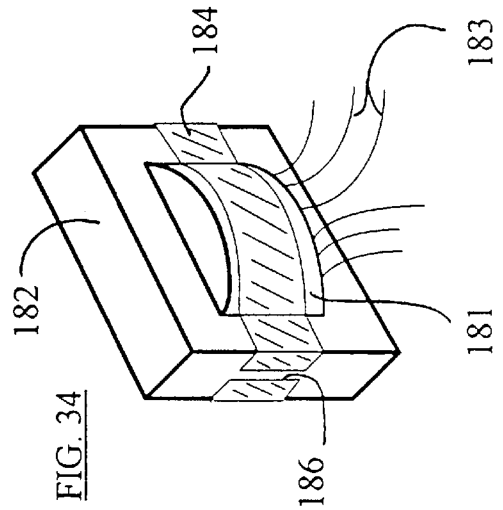

FIG. 34 illustrates an embodiment in which the transformer has windings 181 on the central leg of a magnetic core 182, with leads 183 extending from one side of the winding layers. A shield 184 is wrapped externally about the core and the windings, with the end portions of the tape being spaced apart to form a gap 186 at one end of the core. As in the other embodiments, the shield is fabricated of an electrically conductive material (e.g., aluminum or copper tape) and is connected to the circuit ground to suppress radio frequency E-field radiation.

Figure 35:
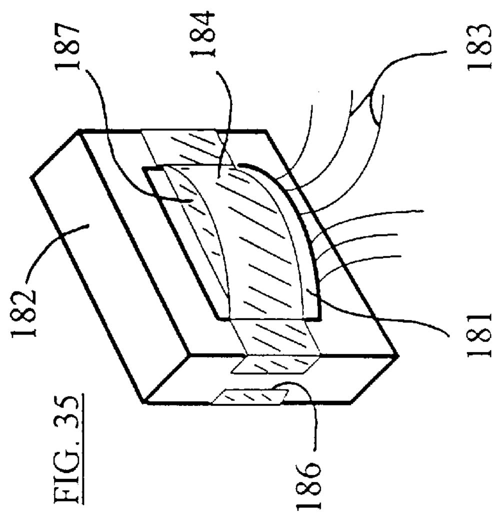
FIGS. 34 and 35 are isometric views of additional embodiments of transformers for use in the ballast system of FIGS. 1–30.

The embodiment of FIG. 35 is similar to the embodiment of FIG. 34, with the shield being extended as indicated at 187 to cover the edges of the windings which project from the magnetic core.

The invention has a number of important features and advantages. It provides a simple, low cost, self-starting oscillator circuit which employs self-biased switching devices with emitter or source degeneration for starting and maintaining oscillation with low currents and low Q resonant conditions. The switching devices and power transformer are protected against damage from large voltage spikes and other transient disturbances, and sensitivity to the coefficient of coupling between the primary and secondary windings of the power transformer is also reduced.

During the transistor switching state, the leakage flux of a loosely coupled transformer can produce large voltage spikes across the switching devices or across any other semiconductors located within the path. By using two resonating capacitors to form a resonant tank at the primary winding, the leakage energy is recirculated through the transformer primary and is absorbed by the circuit loads. The combination of the capacitors, the series RF choke and the inductance of the primary winding also protects the switching transistors against large transient disturbances which can occur in the AC power lines.

With most of the ballasting networks employed in the invention, the oscillator operates at the same resonant frequency with one or two lamps connected, as well as with both lamps disconnected. Because of the resonant operating condition, the resultant impedance of the ballasting network and the lamps is purely resistive, and this permits components of smaller size and lower cost to be used.

The double tuning of the oscillator has another significant advantage in that the output of the secondary winding of the power transformer acts as a constant voltage and frequency source, which is an important factor in delivering a fixed power to each lamp.

It is apparent from the foregoing that a new and improved ballast system has been provided. While only certain presently preferred embodiments have been described in detail, as will be apparent to those familiar with the art, certain changes and modifications can be made without departing from the scope of the invention as defined by the following claims.

I claim:

1. In an electronic ballast system for fluorescent lamps: a power transformer having primary and secondary windings, a power oscillator connected to the primary winding for operation at a predetermined frequency in the range of 10 KHz to 5 MHz, and a ballasting network comprising a differential transformer having a pair of windings with first ends connected to one end of the secondary winding of the power transformer, a series inductor connected between second ends of the differential transformer windings and the other end of the secondary winding, and a resonating capacitor connected in series with each of the fluorescent lamps across the secondary winding, the ballasting network being resonant at substantially the predetermined frequency.

2. The electronic ballast system of claim 1 wherein the fluorescent lamps are instant-start lamps, and the first ends of the differential transformer windings are connected to the secondary winding of the power transformer through contact pins on the lamps.

3. The electronic ballast system of claim 1 wherein the fluorescent lamps are rapid-start lamps, with a first terminal at one end of each lamp being connected to the secondary winding of the power transformer and a second terminal at the one end being left unconnected.

4. In an electronic ballast system for a fluorescent lamp:

a transformer having a primary winding with a center tap, a secondary winding, and a pair of drive windings connected electrically in series;

means for applying operating power to the center tap of the primary winding;

a pair of switching transistors having drain electrodes connected to the primary winding, source electrodes connected to a common source node, and gate electrodes connected to the drive windings;

a resonating capacitor and a damping resistance connected between the source and drain electrodes of each of the transistors forming a tank circuit with the primary winding;

a diode and a sensing resistor connected in series between the common source node and ground;

means connected to the junction of the drive windings for applying a biasing voltage to the gate electrodes; and a ballasting network connected to the secondary winding for connection to a fluorescent lamp.

5. The electronic ballast system of claim 4 wherein the ballasting network comprises a tank circuit having substantially the same resonant frequency as the tank circuit formed by the resonating capacitors and the primary winding.

6. The electronic ballast system of claim 4 wherein the ballasting network is adapted for connection to a plurality of fluorescent lamps and includes impedance elements which are connected to a frequency determining circuit in response to presence of the lamps so that the resonant frequency of the network remains substantially the same regardless of the number of lamps which are connected.

7. In an electronic ballast system for a fluorescent lamp: a power transformer having primary and secondary windings, an open loop shield of electrically conductive material wrapped about the windings and connected to circuit ground for suppressing radio frequency E-field radiation from the transformer, with end portions of the shield overlapping each other and an insulative material disposed between the overlapping end portions to isolate the end portions electrically from each other, a power oscillator connected to the primary winding for operation at a predetermined frequency in the range of 10 KHz to 5 MHz, and a ballasting network connected to the secondary winding and adapted for connection to the fluorescent lamp.

8. In an electronic ballast system for a fluorescent lamp: a power transformer having primary and secondary windings, a power oscillator connected to the primary windings and having at least one switching transistor with gate and source electrodes, biasing means comprising a Zener diode connected to the gate electrode and a degenerative feedback network connected to the source electrode for applying a logarithmically increasing biasing voltage to the gate electrode during start up, and a ballasting network connected to the secondary winding and adapted for connection to the fluorescent lamp.

9. In an electronic ballast system for a fluorescent lamp: an oscillator having a pair of switching transistors, a power transformer having a primary winding to which the oscillator is connected, a secondary winding, and a pair of drive windings connected to control electrodes of the transistors, a self-biasing loop comprising a Zener diode connected to the control electrodes through the drive windings and a degenerative feedback network connected to second electrodes of the transistors, and a ballasting network connected to the secondary winding and adapted for connection to the fluorescent lamp.

10. In an electronic ballast system for a fluorescent lamp: a power transformer having primary and secondary windings, a power oscillator connected to the primary windings, a ballasting network connected to the secondary winding and adapted for connection to the fluorescent lamp, and a Zener diode and a degenerative feedback network connected in the oscillator to provide a control voltage which increases gradually and limits the output of the oscillator so that the power applied to the ballasting network increases gradually during start-up of the system.

11. In an electronic ballast system for a fluorescent lamp: a power supply for providing a DC supply voltage, a power oscillator having a pair of amplifier circuits which are stacked together across the output of the power supply so that only one-half of the supply voltage is applied to each of the amplifier circuits, a ballasting network adapted for connection to the fluorescent lamp, and a power transformer having primary windings connected to the amplifier circuits and a secondary winding connected to the ballasting network.

12. The electronic ballast system of claim 11 wherein each of the amplifier circuits includes a tuning capacitor which resonates with the primary windings, and a switching transistor which controls current flow through the capacitor and the winding.

13. The electronic ballast system of claim 11 including a choke transformer having a pair of tightly coupled, in-phase windings of equal inductance in respective ones of the amplifier circuits.

14. The electronic ballast system of claim 12 including means including drive windings on the power transformer for turning the transistors on alternately, and a choke transformer through which operating power is applied to the primary windings of the transformer from the power supply.

15. The electronic ballast system of claim 12 including a biasing circuit comprising a Zener diode, a voltage divider connected between a voltage source and the cathode of the Zener diode, and means including drive windings on the power transformer connecting the output of the voltage divider and the junction of the voltage divider and the cathode of the Zener diode to gate electrodes of the transistors.

16. The electronic ballast system of claim 11 wherein the amplifier circuits include a pair of resonating capacitors having first sides which are connected to the primary windings, a pair of switching transistors having drain electrodes which are connected to the first sides of the resonating capacitors, a pair of back-to-back diodes and a sensing resistor connected in series between source electrodes of the transistors and second sides of the resonating capacitors, drive windings on the transformer connected to gate electrodes of the transistors, a pair of AC bypass capacitors connected between the drive windings and the second sides of the resonating capacitors, means for turning the transistors on alternately to connect alternate ones of the resonating capacitors in a tank circuit with the primary windings, and an AC grounding capacitor connected between a half supply voltage point and a chassis ground.

17. In an electronic ballast system for a fluorescent lamp:

a transformer having a primary winding with a center tap, a secondary winding, and a pair of drive windings which are connected electrically in series;

means for applying operating power to the center tap of the primary winding;

a pair of resonating capacitors having first sides which are connected to opposite ends of the primary winding and second sides which are connected to ground;

a pair of switching transistors having source electrodes which are connected together and drain electrodes which are connected to the first sides of the resonating capacitors;

a pair of back-to-back diodes, a sensing resistor and an RF choke connected in series between the source electrodes and ground;

an AC bypass capacitor connected between the junction of the drive windings and the RF choke;

means connected to the junction of the drive windings for supplying a biasing voltage to the gate electrodes; and a ballasting network connected to the secondary winding for connection to a fluorescent lamp. comprising a Zener diode, a dropping resistor connected between a voltage source and the cathode of the Zener diode, and means connecting the cathode of the Zener diode to the junction of the drive windings.

18. The electronic ballast system of claim 17 further including a biasing circuit comprising a Zener diode, a dropping resistor connected between a voltage source and the cathode of the Zener diode, and means connecting the cathode of the Zener diode to the junction of the drive windings.

19. In an electronic ballast system for a fluorescent lamp:

a transformer having a primary winding with a center tap, a secondary winding, and a pair of drive windings which are connected electrically in series;

means for applying operating power to the center tap of the primary winding;

a pair of resonating capacitors having first sides which are connected to opposite ends of the primary winding and second sides which are connected to a common source node;

a pair of switching transistors having source electrodes which are connected to the common source node, gate electrodes which are connected to the drive windings, and drain electrodes which are connected to the first sides of the resonating capacitors;

a pair of back-to-back diodes, a sensing resistor and an RF choke connected in series between the common source node and ground;

means connected to the junction of the drive windings for supplying a biasing voltage to the gate electrodes;

means for turning the transistors on alternately to connect alternate ones of the resonating capacitors in a tank circuit with the primary winding;

an AC bypass capacitor connected between the junction of the drive windings and the RF choke; and a ballasting network connected to the secondary winding for connection to a fluorescent lamp.

20. The electronic ballast system of claim 19 further including a biasing circuit comprising a Zener diode, a dropping resistor connected between a voltage source and the cathode of the Zener diode, and means connecting the cathode of the Zener diode to the junction of the drive windings.

21. The electronic ballast system of claim 20 wherein the means connecting the cathode of the Zener diode to the junction of the drive windings comprises a low pass filter.

22. In an electronic ballast system for a fluorescent lamp: a power supply for providing a DC voltage at a supply voltage node, a half voltage node at which the voltage is equal to one half of the supply voltage, a ground node, a transformer having first and second primary windings and a secondary winding, first and second transistors having source, drain and gate electrodes, a choke transformer having a first winding connected in series with the first primary winding between the supply voltage node and drain electrode of the first transistor and a second winding connected in series with the second primary winding between the half voltage node and the drain electrode of the second transistor, a first pair of back-to-back diodes and a first sensing resistor connected in series between the source electrode of the first transistor and the half voltage node, a second pair of back-to-back diodes and a second sensing resistor connected in series between the source electrode of the second transistor and the ground node, a first resonating capacitor connected between the drain electrode of the first transistor and the ground node, a second resonating capacitor connected between the drain electrode of the second transistor and the ground node, means including drive windings on the transformer connected to the gate electrodes of the transistors for turning the transistors on alternately to connect alternate ones of the resonating capacitors in a tank circuit with the primary windings, and a ballasting network connected to the secondary winding of the transformer.

23. The electronic ballast system of claim 22 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

24. The electronic ballast system of claim 22 further including an AC grounding capacitor connected between the half voltage node and a chassis ground.

25. In an electronic ballast system for a fluorescent lamp: a power supply for providing a DC voltage at a supply voltage node, a half voltage node at which the voltage is equal to one half of the supply voltage, a ground node, a transformer having first and second primary windings and a secondary winding, first and second transistors having source, drain and gate electrodes, a choke transformer having a first winding connected in series with the first primary winding between the supply voltage node and drain electrode of the first transistor and a second winding connected in series with the second primary winding between the half voltage node and the drain electrode of the second transistor, a first pair of back-to-back diodes and a first sensing resistor connected in series between the source electrode of the first transistor and the half voltage node, a second pair of back-to-back diodes and a second sensing resistor connected in series between the source electrode of the second transistor and the ground node, a first resonating capacitor connected between the drain electrode of the first transistor and the half voltage node, a second resonating capacitor connected between the drain electrode of the second transistor and the ground node, means including drive windings on the transformer connected to the gate electrodes of the transistors for turning the transistors on alternately to connect alternate ones of the resonating capacitors in a tank circuit with the primary windings, and a ballasting network connected to the secondary winding of the transformer.

26. The electronic ballast system of claim 25 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

27. The electronic ballast system of claim 25 further including an AC grounding capacitor connected between the half voltage node and a chassis ground.

28. In an electronic ballast system for a fluorescent lamp: a power supply for providing a DC voltage at a supply voltage node, a half voltage node at which the voltage is equal to one half of the supply voltage, a ground node, a transformer having first and second primary windings and a secondary winding, first and second transistors having source, drain and gate electrodes, a choke transformer having a first winding connected in series with the first primary winding between the supply voltage node and drain electrode of the first transistor and a second winding connected in series with the second primary winding between the half voltage node and the drain electrode of the second transistor, a first pair of back-to-back diodes and a first sensing resistor connected in series between the source electrode of the first transistor and the half voltage node, a second pair of back-to-back diodes and a second sensing resistor connected in series between the source electrode of the second transistor and the ground node, a first resonating capacitor and a first damping resistance connected in series between the drain and source electrodes of the first transistor, a second resonating capacitor and a damping resistor connected in series between the drain and source electrodes of the second transistor, means including drive windings on the transformer connected to the gate electrodes of the transistors for turning the transistors on alternately to connect alternate ones of the resonating capacitors in a tank circuit with the primary windings, and a ballasting network connected to the secondary winding of the transformer.

29. The electronic ballast system of claim 28 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

30. The electronic ballast system of claim 28 further including an AC grounding capacitor connected between the half voltage node and a chassis ground.

31. In an electronic ballast system for a fluorescent lamp:

a power supply for providing a DC voltage at a supply voltage node;

a half voltage node at which the voltage is equal to one half of the supply voltage;

a ground node;

first and second transistors having source, drain and gate electrodes;

a transformer having a first primary winding connected between the supply voltage node and the drain electrode of the first transistor, a second primary winding connected between the half voltage node and the drain electrode of the second transistor, and a secondary winding;

a choke transformer having first and second windings;

a first pair of back-to-back diodes and a first sensing resistor connected in series with the first choke transformer winding between the source electrode of the first transistor and the half voltage node;

a second pair of back-to-back diodes and a second sensing resistor connected in series with the second choke transformer winding between the source electrode of the second transistor and the ground node;

a first resonating capacitor connected between the drain electrode of the first transistor and the half voltage node;

a second resonating capacitor connected between the drain electrode of the second transistor and the ground node; and a ballasting network connected to the secondary winding of the transformer.

32. The electronic ballast system of claim 31 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

33. In an electronic ballast system for a fluorescent lamp:

a power supply for providing a DC voltage at a supply voltage node;

a half voltage node at which the voltage is equal to one half of the supply voltage;

a ground node;

first and second transistors having source, drain and gate electrodes;

a transformer having a first primary winding connected between the supply voltage node and the drain electrode of the first transistor, a second primary winding connected between the half voltage node and the drain electrode of the second transistor, and a secondary winding;

a choke transformer having first and second windings;

a first pair of back-to-back diodes and a first sensing resistor connected in series with the first choke transformer winding between the source electrode of the first transistor and the half voltage node;

a second pair of back-to-back diodes and a second sensing resistor connected in series with the second choke transformer winding between the source electrode of the second transistor and the ground node;

a first resonating capacitor connected between the drain and source electrodes of the first transistor;

a second resonating capacitor connected between the drain and source electrodes of the second transistor;

means including drive windings on the transformer connected to the gate electrodes of the transistors for turning the transistors on alternately to connect alternate ones of the resonating capacitors in a tank circuit with the primary windings; and a ballasting network connected to the secondary winding of the transformer.

34. The electronic ballast system of claim 33 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

35. In an electronic ballast system for a fluorescent lamp:

a power supply for providing a DC voltage at a supply voltage node;

a half voltage node at which the voltage is equal to one half of the supply voltage;

a ground node;

first and second transistors having source, drain and gate electrodes;

a transformer having a first primary winding connected between the supply voltage node and the drain electrode of the first transistor, a second primary winding, and a secondary winding;

a choke transformer having a first winding, and a second winding connected in series with the second primary winding of the transformer between the half voltage node and the drain electrode of the second transistor;

a first pair of back-to-back diodes and a first sensing resistor connected in series with the first choke transformer winding between the source electrode of the first transistor and the half voltage node;

a second pair of back-to-back diodes and a second sensing resistor connected in series between the source electrode of the second transistor and the ground node;

a first resonating capacitor connected between the drain electrode of the first transistor and the junction of the first sensing resistor and the first winding of the choke transformer;

a second resonating capacitor connected between the drain electrode of the second transistor and the ground node;

means including drive windings on the transformer connected to the gate electrodes of the transistors for turning the transistors on alternately to connect alternate ones of the resonating capacitors in a tank circuit with the primary windings; and a ballasting network connected to the secondary winding of the transformer.

36. The electronic ballast system of claim 35 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

37. The electronic ballast system of claim 35 further including an AC grounding capacitor connected between the half voltage node and a chassis ground.

38. In an electronic ballast system for a fluorescent lamp:

a power supply for providing a DC voltage at a supply voltage node;

a half voltage node at which the voltage is equal to one half of the supply voltage;

a ground node;

first and second transistors having source, drain and gate electrodes;

a transformer having a first primary winding, a second primary winding connected between the half voltage node and the drain electrode of the second transistor, and a secondary winding;

a choke transformer having a first winding connected in series with the first primary winding of the transformer between the supply voltage node and the drain electrode of the first transistor, and a second winding;

a first pair of back-to-back diodes and a first sensing resistor connected in series between the source electrode of the first transistor and the half voltage node;

a second pair of back-to-back diodes and a second sensing resistor connected in series with the second choke transformer winding between the source electrode of the second transistor and the ground node;

a first resonating capacitor connected between the drain electrode of the first transistor and the half voltage node;

a second resonating capacitor connected between the drain electrode of the second transistor and the junction of the second sensing resistor and the second winding of the choke transformer;

means including drive windings on the transformer connected to the gate electrodes of the transistors for turning the transistors on alternately to connect alternate ones of the resonating capacitors in a tank circuit with the primary windings; and a ballasting network connected to the secondary winding of the transformer.

39. The electronic ballast system of claim 38 further including a voltage divider and a Zener diode connected between the supply voltage node and ground with the output of the voltage divider being approximately equal to one-half the difference between the supply voltage and the Zener voltage, means for applying the output of the voltage divider to the gate of the first transistor as a biasing voltage, and means for applying the Zener voltage to the gate of the second transistor as a biasing voltage.

40. The electronic ballast system of claim 38 further including an AC grounding capacitor connected between the half voltage node and a chassis ground.

* * * * *